United States Patent
Yazawa et al.

(10) Patent No.: US 6,650,502 B2
(45) Date of Patent: Nov. 18, 2003

(54) THIN-FILM MAGNETIC HEAD CAPABLE OF NARROWING TRACK WIDTH AND METHOD OF MANUFACTURING THE SAME

(75) Inventors: Hisayuki Yazawa, Niigata-ken (JP); Naruaki Oki, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 125 days.

(21) Appl. No.: 09/769,208

(22) Filed: Jan. 24, 2001

(65) Prior Publication Data

US 2001/0010611 A1 Aug. 2, 2001

(30) Foreign Application Priority Data

Jan. 28, 2000 (JP) ........................................ 2000-019927

(51) Int. Cl.[7] .............................................. G11B 5/147
(52) U.S. Cl. ...................................................... 360/126
(58) Field of Search ........................................ 360/126

(56) References Cited

U.S. PATENT DOCUMENTS 5,325,254 A 6/1994 Cooperrider
5,793,578 A 8/1998 Heim et al.
6,456,459 B1 * 9/2002 Sasaki ........................ 360/126

FOREIGN PATENT DOCUMENTS

JP 6-259231 9/1994

* cited by examiner

*Primary Examiner*—A. J. Heinz
*Assistant Examiner*—Mark Blouin
(74) *Attorney, Agent, or Firm*—Brinks Hofer Gilsor & Lione

(57) ABSTRACT

A lower magnetic pole layer is formed on a lower core layer, and a coil layer and a coil insulating layer are formed in a space corresponding to a level difference between the lower magnetic pole layer and the lower core layer. The coil layer and the coil insulating layer are leveled flush with a reference plane, whereby a gap layer can be formed flat on the lower magnetic pole layer, the coil layer and the coil insulating layer. Thus, since the upper core layer can be directly formed on the gap layer and the gap layer can be formed on the flat surfaces, it is possible to form the upper core layer into a predetermined shape with high accuracy and to manufacture a thin-film magnetic head which is adaptable for a decrease of the track width in future.

48 Claims, 14 Drawing Sheets

THIN-FILM MAGNETIC HEAD CAPABLE OF NARROWING TRACK WIDTH AND METHOD OF MANUFACTURING THE SAME

BACKGROUND OF THE INVENTION

1. Field of the Invention

The present invention relates to a thin-film magnetic head wherein a coil layer is formed between core layers. More particularly, the present invention relates to a thin-film magnetic head and a method of manufacturing the head, which enables an upper core layer to be satisfactorily formed, is adaptable for a narrower track width, and can improve an overwrite characteristic and suppress the occurrence of write fringing.

2. Description of the Related Art

FIG. 30 is a vertical sectional view showing the structure of a conventional a thin-film magnetic head.

The thin-film magnetic head of FIG. 30 is an inductive head for recording, which is disposed at a trailing-side end surface of a slider of a floating magnetic head, the slider floating in an opposed relation to a recording medium, e.g., a disk of a hard disk drive.

Numeral 1 denotes a lower core layer formed of a magnetic material such as an NiFe alloy. A gap layer 2 of a nonmagnetic material, such as $Al_2O_3$ (alumina) or $SiO_2$, is formed on the lower core layer 1. An insulating layer 9 of a resist material or any other suitable organic material is formed on the gap layer 2.

On the insulating layer 9, a coil layer 4 is spirally formed using a conductive material having low electrical resistance, such as Cu. Note that the coil layer 4 is formed to surround a base end portion 6b of an upper core layer 6 (described later), but only a part of the coil layer 4 appears in FIG. 30.

The coil layer 4 is covered by an insulating layer 5 of, e.g., an organic material, and the upper core layer 6 is formed on the insulating layer 5 by plating a magnetic material such as Permalloy. A fore end portion 6a of the upper core layer 6 is joined to the lower core layer 1 through the gap layer 2 on the side facing a recording medium, whereby a magnetic gap with a gap length GI is formed. The base end portion 6b of the upper core layer 6 is magnetically connected to the lower core layer 1 through a hole formed in the gap layer 2.

The fore end portion 6a of the upper core layer 6 is formed such that its size in the direction of track width (X-direction as indicated in FIG. 30) is equal to a track width Tw. A recent trend toward a higher recording density requires the track width Tw to be reduced to a smaller value.

In such an inductive head for writing, when a recording current is applied to the coil layer 4, a recording magnetic field is induced in the lower core layer 1 and the upper core layer 6. Then, a magnetic signal is recorded on a recording medium, such as a disk of a hard disk drive, with a fringing magnetic field through a magnetic gap area between the lower core layer 1 and the fore end portion 6a of the upper core layer 6.

The upper core layer 6 of the thin-film magnetic head described above is formed by the so-called frame plating method. FIG. 31 shows one of successive steps for forming the upper core layer 6.

As shown in FIG. 31, after forming the coil layer 4 and covering the coil layer 4 by the insulating layer 5, an undercoat layer 7 of a magnetic material, e.g., an NiFe alloy, is formed over an area extending from an exposed portion of the gap layer 2 near a fore end of the head to the insulating layer 5.

Then, after forming a resist layer 8 on the undercoat layer 7, a pattern corresponding to the shape of the upper core layer 6 is formed on the resist layer 8 by exposure and development, and a layer of a magnetic material (i.e., the upper core layer 6) is formed by plating on the undercoat layer 7 that is exposed through the formed pattern. After the plating, by removing the resist layer 8 remained, the upper core layer 6 is completed as shown in FIG. 30.

However, the conventional thin-film magnetic head has accompanied the following problems in forming the upper core layer 6 from the structural point of view.

As shown in FIG. 31, since the insulating layer 9, the coil layer 4 and the insulating layer 5 are formed on the lower core layer 1 one above another, the layered films are heaped from the surface of the lower core layer 1 with a thickness H3. Therefore, the resist layer 8 has a very large film thickness H1 in an area of the lower core layer 1 on which the coil layer 4, etc. are not formed, i.e., in a part of the resist layer 8 which is formed on the lower core layer 1 near its fore end. On the contrary, the resist layer 8 formed on the insulating layer 5 has a small film thickness H2.

For that reason, it is hard to precisely adjust the depth of a focus in the steps of exposure and development for patterning the resist layer 8, thus resulting in a difficulty in forming the pattern of the upper core layer 6 in a predetermined shape on the resist layer 8 and hence deterioration of pattern accuracy.

In particular, as described above, the fore end portion 6a of the upper core layer 6 is formed to have a width equal to the track width Tw. To realize a higher recording density in future, the track width Tw must be realized at a smaller value.

Further, as described above, the film thickness H1 of a portion of the resist layer 8, in which the fore end portion 6a of the upper core layer 6 is to be formed, is very large. The large depth of a focus is therefore required in the steps of exposure and development to form a pattern in the portion of the resist layer 8 having the film thickness Hi. However, the large depth of a focus deteriorates resolution, and the fore end portion 6a of the upper core layer 6 is formed with a width larger than the track width Tw of a predetermined size.

Moreover, because of a heap defined by the insulating layers 5, 9 and the coil layer 4 which are formed on the lower core layer 1, the film thickness H1 of the resist layer 8 is not uniform and an adverse effect such as diffused reflection is more likely to occur during exposure and development. It is hence impossible to form the upper core layer 6 into a predetermined shape. Particularly, it is impossible to form the fore end portion 6a of the upper core layer 6 so as to have a width equal to the track width Tw of a predetermined size.

To overcome the above-mentioned problems, there is proposed, for example, a method of forming the insulating layers 5, 9 and the coil layer 4 at a position shifted in the height direction (Y-direction as indicated in the drawings), and increasing a length T1 of the area of the lower core layer 1 near its fore end on which the coil layer 4, etc. are not formed. Thus, the method is intended to form the fore end portion 6a of the upper core layer 6 to have a width, which is equal to the predetermined track width Tw, by reducing the film thickness of the resist layer 8 formed on the area of the length T1 to a value smaller than in the case shown in FIG. 31.

Even with the above-mentioned method, however, it is unavoidable that the film thickness of the resist layer 8 is not uniform. Accordingly, a difficulty still remains in forming the upper core layer 6 into a predetermined shape due to such an adverse effect as diffused reflection occurred during exposure and development.

Further, when the coil layer 4, etc. are formed at a position shifted in the height direction (Y-direction as indicated in the drawings), the fore end portion 6a of the upper core layer 6 can be formed to have a larger length. However, since the fore end portion 6a of the upper core layer 6 is in the elongate form of the track width Tw, magnetic saturation is more likely to occur in the fore end portion 6a, and deterioration of the OW characteristic is caused.

The term "overwrite" means an operation of writing data over data previously written in the same position. The OW characteristic is evaluated by the steps of recording data at low frequency, overwriting the recorded data with new data at high frequency, and measuring how much a remaining output of a recording signal at the low frequency has reduced from an original output of the recording signal at the low frequency as obtained before overwriting with the new data at the high frequency.

SUMMARY OF THE INVENTION

With the view of overcoming the problems set forth above, the present invention provides a thin-film magnetic head and a method of manufacturing the head, which enables an upper core layer to be formed into a predetermined shape, and can improve an overwrite characteristic and suppress the occurrence of write fringing.

A thin-film magnetic head according to the present invention comprises a lower core layer, an upper core layer positioned in an opposing relation to the lower core layer through a nonmagnetic gap layer at a head surface facing a recording medium, the magnetic head further comprising a lower magnetic pole layer being formed on the lower core layer to extend from the head surface facing the recording medium over a predetermined length in a height direction, the gap layer contacting the lower magnetic pole layer; and a coil layer and a coil insulating layer being formed in a space corresponding to a level difference between the lower magnetic pole layer and the lower core layer, the coil insulating layer filling spaces defined at a pitch of conductors of the coil layer between the conductors; an upper surface of the coil insulating layer or upper surfaces of both the coil insulating layer and the coil layer being leveled flush with a reference plane, which is assumed to be defined by a junction surface between the lower magnetic pole layer and the gap layer, so that a flat surface extends in the height direction along the reference plane, the upper core layer having a portion exposed at the head surface facing the recording medium and contacting the gap layer at a track width Tw.

An main object of the present invention is to form the upper core layer into a predetermined shape. To achieve the object, particularly, a position in which the coil layer is formed is changed from that in a conventional magnetic head.

In the conventional magnetic head, a coil layer is formed on a gap layer. With such a structure, the coil layer, etc. cannot be avoided from heaping to a large extent from the gap layer when formed on it. It is therefore difficult to form the upper core layer with high pattern accuracy within a satisfactory allowance.

The inventors found that the upper core layer can be formed with high pattern accuracy by forming the coil layer under the gap layer.

The thin-film magnetic head according to the present invention has structural features as follows. In the magnetic head of the present invention, the lower magnetic pole layer is formed on the lower core layer. The coil layer and the coil insulating layer are formed in the space corresponding to the level difference between the lower magnetic pole layer and the lower core layer.

Further, assuming the junction surface between the lower magnetic pole layer and the gap layer to be a reference plane, an upper surface of the coil insulating layer or upper surfaces of both the coil insulating layer and the coil layer, which are formed in the aforesaid space, are leveled flush with the reference plane, and a flat surface is formed to extend in the height direction along the reference plane.

Since the gap layer is formed to extend over the flat upper surfaces of the lower magnetic pole layer and the flat upper surface of the coil insulating layer or the flat upper surfaces of both the coil insulating layer and the coil layer. Therefore, the gap layer also has a flat upper surface.

Then, in the present invention, the upper core layer can be directly formed on the flat upper surface of the gap layer, and a surface on which the upper core layer is to be formed includes neither projections nor recesses which have been present in the conventional magnetic head. Accordingly, a resist layer used for forming the upper core layer can be formed with a reduced and uniform film thickness, and an adverse effect such as diffused reflection can be prevented from occurring during exposure and development. As a result, the upper core layer can be formed with high pattern accuracy. In particular, a fore end portion of the upper core layer exposed at the head surface facing the recording medium can be high-accurately formed with the track width Tw of a predetermined size.

Also, since the upper core layer is formed on the flat surface, the fore end portion of the upper core layer, which is formed with the track width Tw, can be formed to have a shorter length. It is hence possible to avoid magnetic saturation near the fore end of the upper core layer, to reduce attenuation of magnetic flux density, and to improve the OW characteristic.

In the present invention, preferably, the gap layer sandwiched between the upper core layer and the lower magnetic pole layer is formed with the track width Tw, and the lower magnetic pole layer includes a projected portion contacting the gap layer and having a width equal to the track width Tw. In this case, preferably, slopes inclining in directions away from the upper core layer are formed to extend from a base end of the projected portion at upper surfaces of the lower magnetic pole layer on both sides of the projected portion. With these features, the occurrence of write fringing can be suppressed.

Also, in the present invention, the lower magnetic pole layer may be formed integrally with the lower core layer.

Further, preferably, a lift layer is formed on a rear end portion of the lower core layer and an upper surface of the lift layer is positioned flush with the reference plane, the lift layer contacting a base end portion of the upper core layer. By forming the lift layer, magnetic coupling between the lower core layer and the upper core layer can be easily established, and the manufacture of the thin-film magnetic head can be facilitated.

The lift layer may be formed integrally with the lower core layer.

Preferably, the coil insulating layer is formed of an inorganic insulating material.

In the present invention, the surfaces flush with the reference plane are surfaces flattened by trimming. As described later in more detail in connection with the manufacturing method, the surfaces flush with the reference plane are obtained by polishing using the CMP technology, for example.

Preferably, an insulating undercoat layer is formed between the coil layer and the lower core layer. This feature enables a dielectric withstand voltage between the coil layer and the lower core layer to be improved.

The thin-film magnetic head of the present invention may further comprise an upper magnetic pole layer formed on the gap layer to extend from the head surface facing the recording medium over a predetermined length in the height direction, the upper magnetic pole layer having a portion exposed at the head surface facing the recording medium and formed with the track width Tw; and a second coil layer being electrically connected to the coil layer and introducing a recording magnetic field to the lower core layer and the upper core layer, and a second coil insulating layer filling spaces defined at a pitch of conductors of the second coil layer between the conductors, the second coil layer and the second coil insulating layer being formed on the gap layer to locate in an area extending from the upper magnetic pole layer in the height direction; the upper core layer being joined onto the upper magnetic pole layer at a position spaced from the head surface facing the recording medium in the height direction.

The above features represent the coil layer having a two-layered structure. By employing the two-layered structure, the coil layer can be formed with a smaller width, and the length of a magnetic path established through the lower core layer and the upper core layer can be reduced. It is therefore possible to achieve a reduction of inductance and to manufacture a thin-film magnetic head adaptable for an increase of the recording density in future.

Also, in the thin-film magnetic head having the above features, the upper magnetic pole layer is formed on the gap layer, and has a portion which is exposed at the head surface facing the recording medium and is formed with the track width Tw. Since the upper magnetic pole layer is directly formed on the flat upper surface of the gap layer, the upper magnetic pole layer can be formed to have the track width Tw of a predetermined size with high accuracy.

Further, the upper core layer formed on the upper magnetic pole layer is extended in the height direction from a position spaced from the head surface facing the recording medium so that the upper core layer is not exposed to the head surface facing the recording medium.

With such an arrangement, there is no longer a need of forming the upper core layer so as to have a fore end portion with the track width Tw, and the upper core layer serves only to couple a magnetic path between the upper magnetic pole layer and the lower core layer. From the viewpoint of avoiding magnetic saturation, therefore, the upper core layer is preferably formed with a width larger than the track width Tw.

As a result, even when the surface on which the upper core layer is to be formed is heaped to some extent, the upper core layer having a relatively large width can be formed into the predetermined shape with high pattern accuracy.

Additionally, since the upper core layer is formed on the upper magnetic pole layer to extend from a position spaced away from the surface facing the recording medium in the height direction, the occurrence of write fringing can be suppressed.

In the present invention, preferably, the upper magnetic pole layer comprises a fore end portion formed with the track width Tw, and a rear portion formed to extend from a base end of the fore end portion in the height direction with a width gradually increasing, the upper core layer being joined onto the rear portion of the upper magnetic pole layer.

Further, assuming a junction surface between the upper magnetic pole layer and the upper core layer to be a second reference plane, an upper surface of the second coil insulating layer or upper surfaces of both the second coil insulating layer and the second coil layer may be leveled flush with the second reference plane so that a flat surface extends in the height direction along the second reference plane.

In that case, preferably, the second coil insulating layer is formed of an inorganic insulating material. Also, the surfaces flush with the second reference plane are surfaces flattened by trimming.

With the above features, the upper core layer can be formed on a part of the upper magnetic pole layer and the upper surface of the second coil insulating layer or the upper surfaces of both the second coil insulating layer and the second coil layer with higher pattern accuracy.

The second coil insulating layer may be formed of an organic insulating material. In this case, since the second coil insulating layer is heaped from the second reference surface to some extent, the upper core layer cannot be formed on a perfectly flat surface. However, the upper core layer can be formed into the predetermined shape even with slightly reduced accuracy as mentioned above, and hence such a heap does not significantly affect the pattern formation of the upper core layer.

Preferably, when a lift layer is not formed on the lower core layer, a second lift layer is formed to rise from the lower core layer, and when a lift layer is formed on the lower core layer, the second lift layer is formed on the lift layer, a base end portion of the upper core layer being formed in contact with an upper surface of the second lift layer. These features enable the lower core layer and the upper core layer to be magnetically connected to each other with more ease.

The present invention also provides a method of manufacturing a thin-film magnetic head comprising a lower core layer, an upper core layer positioned in an opposing relation to the lower core layer through a nonmagnetic gap layer at a head surface facing a recording medium, and a coil layer for introducing a recording magnetic field to the lower core layer and the upper core layer, the method comprising the steps of (a) forming a lower magnetic pole layer on the lower core layer to extend from the head surface facing the recording medium over a predetermined length in a height direction; (b) forming an insulating undercoat layer on the lower core layer; (c) forming a coil layer and a coil insulating layer on the insulating undercoat layer, the coil insulating layer filling spaces defined at a pitch of conductors of the coil layer between the conductors; (d) trimming an upper surface of the coil insulating layer or upper surfaces of both the coil layer and the coil insulating layer to be flush with a reference plane, which is assumed to be defined by the upper surface of the lower magnetic pole layer, so that a flat surface extends in the height direction along the reference plane; (e) forming a gap layer on the upper surface of the lower magnetic pole layer and the flat surface; and (f) forming an upper core layer on the gap layer by patterning, the upper core layer having a portion exposed at the head surface facing the recording medium and having a width equal to a track width Tw.

Thus, in the manufacturing method of the present invention, the lower magnetic pole layer is formed on the lower core layer in the step (a), and the coil layer and the coil insulating layer are formed in a space corresponding to a level difference between the lower core layer and the lower magnetic pole layer in the step (c).

Further, in the step (d), the upper surface of the coil insulating layer or the upper surfaces of both the coil layer and the coil insulating layer are leveled using the CMP technology, for example, to be flush with the reference plane (i.e., the upper surface of the lower magnetic pole layer), so that a flat surface extends in the height direction along the reference plane. Then, the gap layer is formed on the upper surface of the lower magnetic pole layer (reference plane) and the flat surface. This enables the upper core layer to be formed on the gap layer having a flat upper surface. Accordingly, a resist layer used for forming the upper core layer can be formed with a reduced film thickness, and an adverse effect such as diffused reflection can be prevented from occurring during exposure and development. As a result, the upper core layer can be formed with high pattern accuracy. In particular, a portion near a fore end of the upper core layer can be formed to have a width equal to the track width Tw of a predetermined size. A thin-film magnetic head adaptable for a narrower track width can be manufactured.

In the manufacturing method of the present invention, preferably, the step (a) includes a step of forming a lift layer of a magnetic material on the lower core layer on the side away from the head surface facing the recording medium, the step (d) includes a step of trimming an upper surface of the lift layer to be flush with the reference plane, and the step (f) includes a step of joining a base end portion of the upper core layer to the upper surface of the lift layer. By forming the lift layer, magnetic coupling between the upper core layer and the lower core layer can be easily established, and the manufacture of the thin-film magnetic head can be facilitated.

Also, preferably, the step (a) includes a step of forming the lower magnetic pole layer on the lower core layer by frame plating, and a step of, when a lift layer is also formed on the lower core layer, forming the lift layer by the frame plating at the same time as forming the lower magnetic pole layer.

In the above case, preferably, the manufacturing method further comprises a step of filling surroundings of the lower core layer by an insulating layer prior to forming the lower magnetic pole layer or both the lower magnetic pole layer and the lift layer, and a step of leveling upper surfaces of the lower core layer and the insulating layer to be flush with each other.

Further, in the manufacturing method of the present invention, the step (a) may include a step of protecting an area of the upper surface of the lower core layer on which the lower magnetic pole layer is to be formed, and then trimming a remaining area of the upper surface of the lower core layer, thereby forming the lower magnetic pole layer to project from the lower core layer, or a step of, when a lift layer is also formed on the lower core layer, protecting areas of the upper surface of the lower core layer on which the lower magnetic pole layer and the lift layer are to be formed, and then trimming a remaining area of the upper surface of the lower core layer, thereby forming the lower magnetic pole layer and the lift layer to project from the lower core layer.

In the above case, preferably, the manufacturing method further comprises a step of filling surroundings of the lower core layer by an insulating layer prior to forming the lower magnetic pole layer or both the lower magnetic pole layer and the lift layer, and a step of leveling the upper surfaces of the lower core layer and the insulating layer to be flush with each other.

Preferably, the manufacturing method of the present invention further comprises, subsequent to the step (f), steps of (g) removing portions of the gap layer which are extended from a junction surface between the upper core layer and the gap layer on both sides of the upper core layer formed with the track width Tw; (h) trimming the upper surfaces of the lower magnetic pole layer that have been exposed by removing the portions of the gap layer so that a junction surface between the lower magnetic pole layer and the gap layer has a width equal to the track width Tw, thereby forming a projected portion of the lower magnetic pole layer to extend in a direction toward the upper core layer; and (i) a step of forming slopes to extend from a base end of the projected portion at the upper surfaces of the lower magnetic pole layer on both sides of the projected portion, the slopes inclining in directions away from the upper core layer.

By employing the above-mentioned steps, a thin-film magnetic head capable of realizing a narrower track width and suppressing the occurrence of write fringing can be manufactured.

Preferably, the coil insulating layer filling the spaces defined at a pitch of conductors of the coil layer between the conductors is formed of an inorganic insulating material. This feature enables the upper surface of the coil insulating layer to be satisfactorily polished using the CMP technology, for example.

Moreover, instead of the step (f), the manufacturing method of the present invention preferably comprises (j) forming an upper magnetic pole layer on the gap layer to extend from the head surface facing the recording medium over a predetermined length in the height direction, the upper magnetic pole layer having a portion exposed at the head surface facing the recording medium and formed with the track width Tw; (k) forming a second coil layer and a second coil insulating layer on the gap layer to extend from the upper magnetic pole layer in the height direction, the second coil insulating layer filling spaces defined at a pitch of conductors of the second coil layer between the conductors; and (l) joining the upper core layer onto the upper magnetic pole layer at a position spaced from the head surface facing the recording medium in the height direction.

With the above manufacturing method, the coil layer can be formed of a two-layered structure. Therefore, the coil layer can be formed with a smaller width, and the length of a magnetic path established through the lower core layer and the upper core layer can be reduced.

Also, the upper magnetic pole layer can be formed on the flat upper surface of the gap layer, and the fore end portion of the upper magnetic pole layer can be formed to have a width equal to the track width Tw of a predetermined size with high accuracy.

Further, by forming the upper core layer on the upper magnetic pole layer to extend from the position spaced from the head surface facing the recording medium in the height direction, the upper core layer can be formed with a width larger than the track width Tw. Accordingly, even when the surface on which the upper core layer is to be formed is heaped to some extent, the upper core layer can be formed into the predetermined shape with more ease.

Preferably, the step (j) includes a step of forming the upper magnetic pole layer by forming a fore end portion with the track width Tw, and forming a rear portion to extend from a base end of the fore end portion in the height direction with a width gradually increasing, and the step (l) includes a step of joining the upper core layer onto the rear portion of the upper magnetic pole layer.

Further, the step (k) may include a step of trimming an upper surface of the second coil insulating layer or upper surfaces of both the second coil layer and the second coil insulating layer to be flush with a second reference plane, which is assumed to be defined by the upper surface of said upper magnetic pole layer, so that a flat surface extends in the height direction along the second reference plane. In this case, preferably, the second coil insulating layer filling the spaces defined at a pitch of conductors of the second coil layer between the conductors is formed of an inorganic insulating material.

The above step can be realized by using, e.g., the CMP technology. By leveling the upper surface of the second coil insulating layer or the upper surfaces of both the second coil layer and the second coil insulating layer to be flush with the second reference plane (i.e., the upper surface of the second coil insulating layer), the upper core layer can be formed on the second reference surface in the predetermined shape with high pattern accuracy.

The second coil insulating layer filling the spaces defined at a pitch of conductors of the second coil layer between the conductors may be formed of an organic insulating material.

In addition, preferably, the step (j) includes a step of forming a second lift layer on a lift layer when the lift layer is formed on the lower core layer, or on the lower core layer when the lift layer is not formed on the lower core layer, and the step (l) includes a step of joining a base end portion of the upper core layer onto the second lift layer.

In the above steps, the second lift layer is formed on the lift layer which is formed on the lower core layer, or on the lower core layer. By employing those steps, when the coil layer is of the two-layered structure, magnetic coupling between the upper core layer and the lower core layer can be easily established, and the manufacture of the thin-film magnetic head can be facilitated.

DESCRIPTION OF THE PREFERRED EMBODIMENTS

Figure 1:
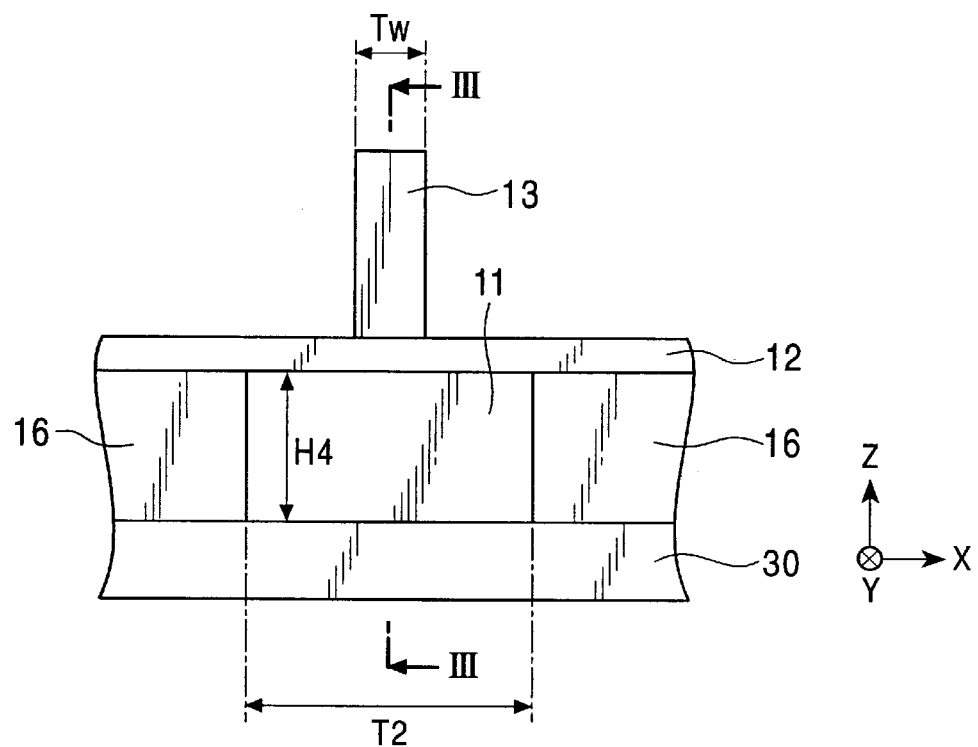
FIG. 1 is a partial front view showing one structure of a thin-film magnetic head according to the present invention.
Figure 2:
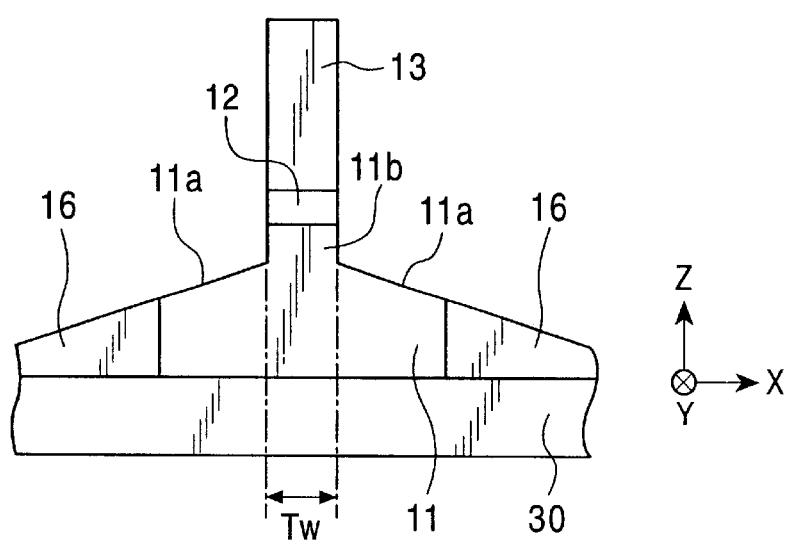
FIG. 2 is a partial front view showing another structure of the thin-film magnetic head according to the present invention.
Figure 3:
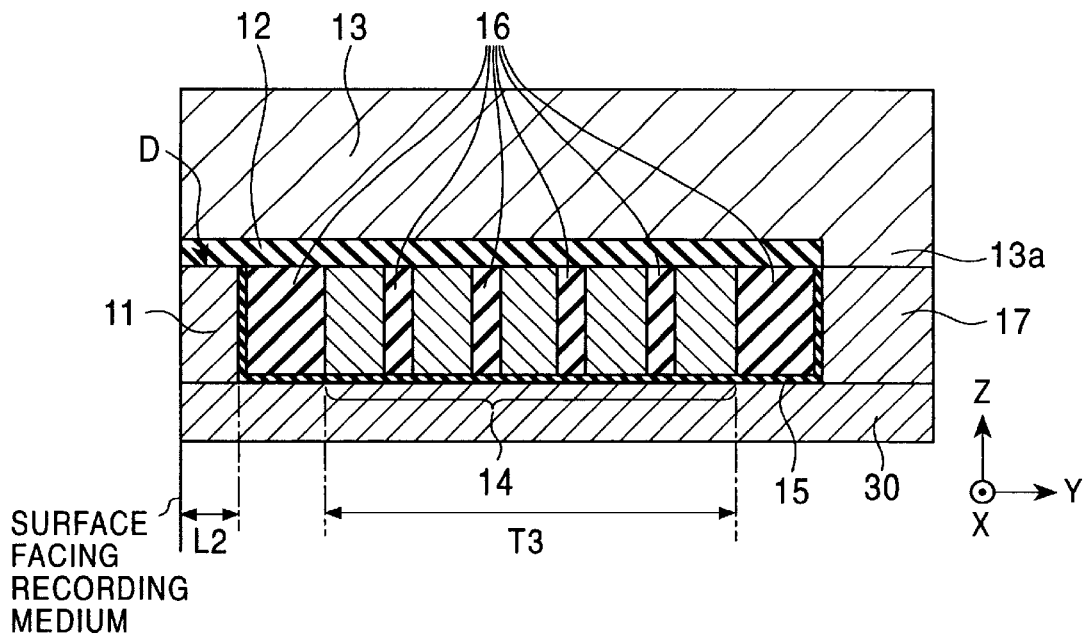
FIG. 3 is a partial vertical sectional view of the thin-film magnetic head taken along line III—III in FIG. 1.
Figure 4:
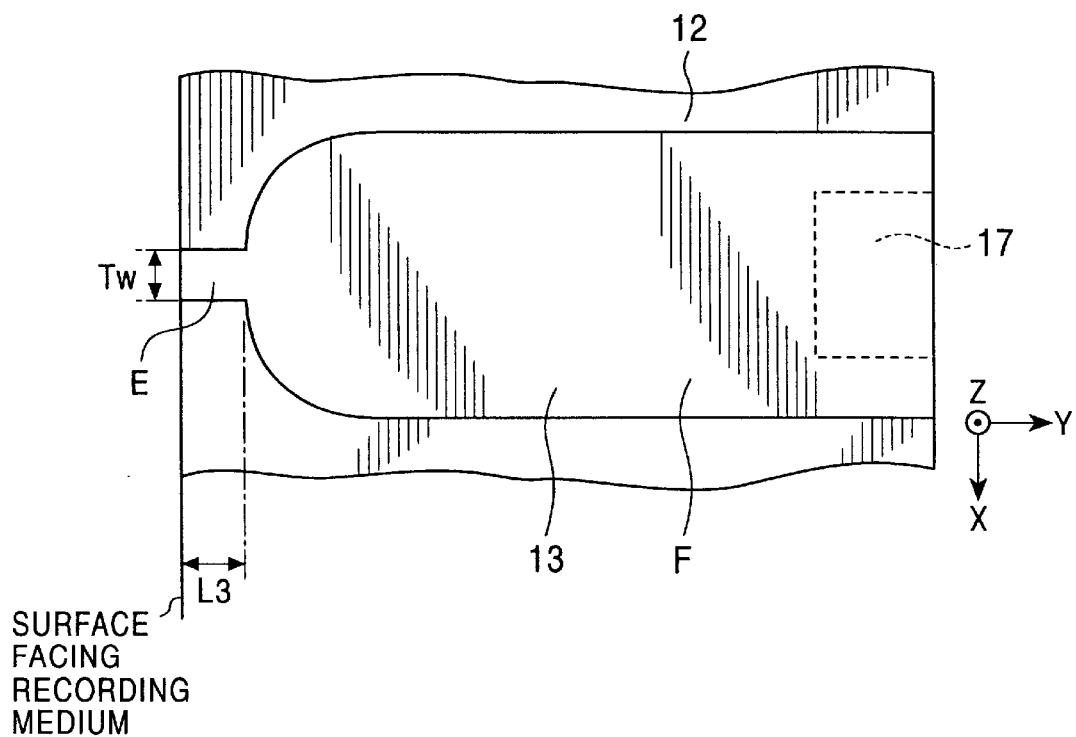
FIG. 4 is a partial plan view of the thin-film magnetic head shown in FIG. 1.
Figure 5:
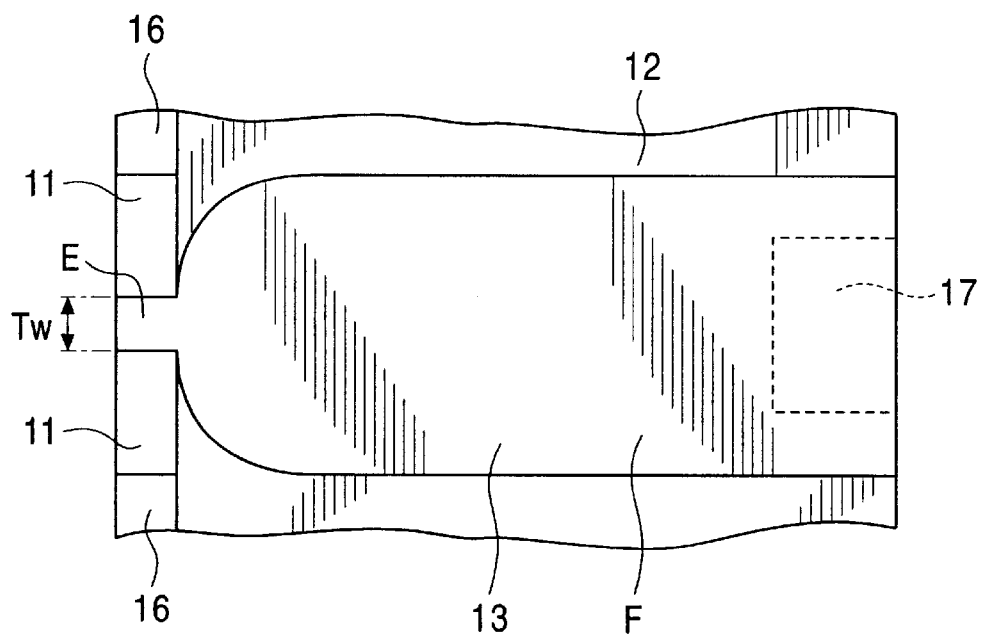
FIG. 5 is a partial plan view of the thin-film magnetic head shown in FIG. 2.

FIG. 1 is a partial front view showing the structure of a thin-film magnetic head according to one embodiment of the present invention, looking at a (head) surface facing a recording medium; FIG. 2 is a partial front view showing the structure of a thin-film magnetic head according to another embodiment of the present invention; FIG. 3 is a partial vertical sectional view of the thin-film magnetic head taken along line III—III in FIG. 1; FIG. 4 is a partial plan view of the thin-film magnetic head shown in FIG. 1; and FIG. 5 is a partial plan view of the thin-film magnetic head shown in FIG. 2.

The thin-film magnetic heads shown in FIGS. 1 to 5 are inductive heads for recording. The present invention may also be applied to the so-called composite thin-film magnetic head in which a reproducing head (MR head) utilizing the magnetoresistive effect is formed under an inductive head in a stacked structure.

Referring to FIG. 1, numeral 30 denotes a lower core layer formed of a magnetic material such as Permalloy. In the case of forming a reproducing head under the lower core layer 30, a shield layer for protecting a magnetoresistive device against noises may be formed separately from the lower core layer 30, or the lower core layer 30 may be used to serve also as an upper shield layer for the reproducing head without forming the shield layer.

As will be seen from FIG. 1, a lower magnetic pole layer 11 is formed on the lower core layer 30. The lower magnetic pole layer 11 is formed to be exposed at the surface facing the recording medium as with the lower core layer 30, and a lower surface of the lower magnetic pole layer 11 is magnetically connected to the lower core layer 30.

The lower magnetic pole layer 11 may be formed of the same material as or a different material from the lower core layer 30. For the purpose of improving the recording density, however, the lower magnetic pole layer 11 is preferably formed of a magnetic material having a higher saturation magnetic flux density than that of the lower core layer 30.

As shown in FIG. 1, the lower magnetic pole layer 11 is formed to have a width T2 in the direction of the track width (X-direction as indicated in FIG. 1). This width T2 is required to be set larger than at least a width (=track width Tw) of the upper core layer 13.

Also, as shown in FIG. 1, the lower magnetic pole layer 11 is formed to have a height H4. If this height H4 is too small, a sufficient height of a coil layer 14 (described later) cannot be obtained. This results in an increased length of a magnetic path because a width T3 (see FIG. 3) of the coil layer 14 must be increased for reducing a coil resistance value.

Conversely, if the height H4 of the lower magnetic pole layer 11 is too large, other problems arise in that a difficulty in forming the lower magnetic pole layer 11 is increased, magnetic saturation is more likely to occur in the lower magnetic pole layer 11, and the magnetic head is not adaptable for an increase of the recording density in future.

The width T2 of the lower magnetic pole layer 11 is just required to be not larger than the width of the lower core layer 30. In practice, the width T2 of the lower magnetic pole layer 11 is preferably in the range of 5 $\mu$m–100 $\mu$m, and the height H4 thereof is preferably in the range of 1 $\mu$m–5 $\mu$m.

Further, as seen from FIG. 3, the lower magnetic pole layer 11 is formed to have a length L2 in the height direction (Y-direction as indicated in FIG. 3). Thus, the lower magnetic pole layer 11 is formed in a rectangular sectional shape on the lower core layer 30. In this embodiment, the length of the lower magnetic pole layer 11 is defined as a gap depth Gd. The gap depth Gd is set to a predetermined length in advance because it greatly affects electromagnetic conversion effected by the thin-film magnetic head.

In the present invention, as shown in FIG. 3, the coil layer 14 is formed in a space corresponding to a level difference between the lower magnetic pole layer 11 and the lower core layer 30.

Also, as shown in FIG. 3, an insulating undercoat layer 15 is formed between the lower core layer 30 and the coil layer 14 for electrical insulation between them. The insulating undercoat layer 15 shown in FIG. 3 is formed of an inorganic insulating material.

The inorganic insulating material is at least one selected from among AlO, $AL_2O_3$, $SiO_2$, $Ta_2O_5$, TiO, AlN, AlSiN, TiN, SiN, $Si_3N_4$, NiO, WO, $WO_3$, BN, CrN, and SiON.

When an inorganic insulating material is used for the insulating undercoat layer 15, the layer 15 can be formed by a known method, e.g., sputtering, as described later in connection with the manufacturing method.

When the insulating undercoat layer 15 is formed of an inorganic insulating material, defects such as pinholes are apt to occur in the insulating undercoat layer 15. It is therefore preferable that the insulating undercoat layer 15 be of a two-layered structure comprising an insulating undercoat layer formed of an inorganic insulating material and an insulating undercoat layer formed of an organic insulating material. As an alternative, the insulating undercoat layer 15 is preferably provided as a single insulating undercoat layer formed of an organic insulating material. Using an organic insulating material enables a dielectric withstand voltage to be improved. The organic insulating material may be any of known materials such as a resist and polyimide.

As shown in FIG. 3, a coil insulating layer 16 is formed so as to fill spaces defined at the pitch of conductors of the coil layer 14 between the conductors. Also, as shown in FIG. 1, the coil insulating layer 16 is formed to extend out of the lower magnetic pole layer 11 on both sides so that the extended portions are exposed as viewed from the surface facing the recording medium.

In this embodiment, as seen from FIG. 3, assuming that a junction surface between the lower magnetic pole layer 11 and a gap layer 12 is a reference plane D, an upper surface of the coil layer 14 and an upper surface of the coil insulating layer 16 are leveled flush with the reference plane D.

Accordingly, in this embodiment, a falt surface is formed to extend in the height direction (Y-direction as indicated in FIG. 3) along the reference plane D.

In order to make the upper surfaces of the coil layer 14 and the coil insulating layer 16 flush with the reference plane D, the upper surfaces of the coil layer 14 and the coil insulating layer 16 are polished by using, e.g., the CMP technology as described later, until those surfaces have a level coincident with the reference plane D. Thus, the above-mentioned flat surface is provided as a polished surface.

In the embodiment shown in FIG. 3, since the upper surface of the coil layer 14 is leveled flush with the reference plane D, the height of the coil layer 14 can be maximized within the level difference between the lower magnetic pole layer 11 and the lower core layer 30. As a result, the width T3 of the coil layer 14 can be minimized and the length of a magnetic path passing through the lower core layer 30 and the upper core layer 13 can be reduced correspondingly.

In the present invention, however, the upper surface of the coil layer 14 may be formed to position at a level lower than the reference plane D. In this case, the upper surface of the coil layer 14 is covered by forming the coil insulating layer 16, and the upper surface of only the coil insulating layer 16 is leveled flush with the reference plane D.

Further, in the present invention, the coil insulating layer 16 is preferably formed of an inorganic insulating material. The reason is that when the coil insulating layer 16 is formed of an inorganic insulating material, it is possible to properly and easily polish the upper surface of the coil insulating layer 16 in the polishing step using, for example, the CMP technology.

On the other hand, if the coil insulating layer 16 is formed of an organic insulating material, this gives rise to an undesired result that the upper surface of the coil insulating layer 16 cannot be properly polished because of viscosity specific to the organic insulating material.

However, when the coil insulating layer 16 is formed of an inorganic insulating material, there is a fear that defects such as voids may be produced in the coil insulating layer 16 because the inorganic insulating material is hard to enter gaps between the conductors of the coil layer 14, which are spaced from each other at the predetermined pitch, in the step of forming the coil insulating layer 16 by sputtering, for example. From the viewpoint of avoiding those defects, it is preferable that an organic insulating material is first employed to fill the gaps between the conductors of the coil layer 14, which are spaced from each other at the predetermined pitch, up to a position lower than the reference plane D, and the coil insulating layer 16 of an inorganic insulating material is then formed on each layer of the organic insulating material.

In the illustrated embodiment, as described above, since the upper surfaces of the coil layer 14 and the coil insulating layer 16 are leveled flush with the reference plane D, a flat surface is formed to extend in the height direction (Y-direction as indicated in FIG. 3) along the reference plane D.

Further, in the present invention, the gap layer 12 is formed on the lower magnetic pole layer 11, the coil layer 14 and the coil insulating layer 16, all of which have flat surfaces flush with each other, as seen from FIG. 3. Hence, the gap layer 12 also has a flat surface.

The gap layer 12 is formed of an inorganic insulating material. In practice, the inorganic insulating material is preferably given by one or more selected from among $Al_2O_3$, $SiO_2$, SiON, AlN, and AlSiN.

Figure 30:
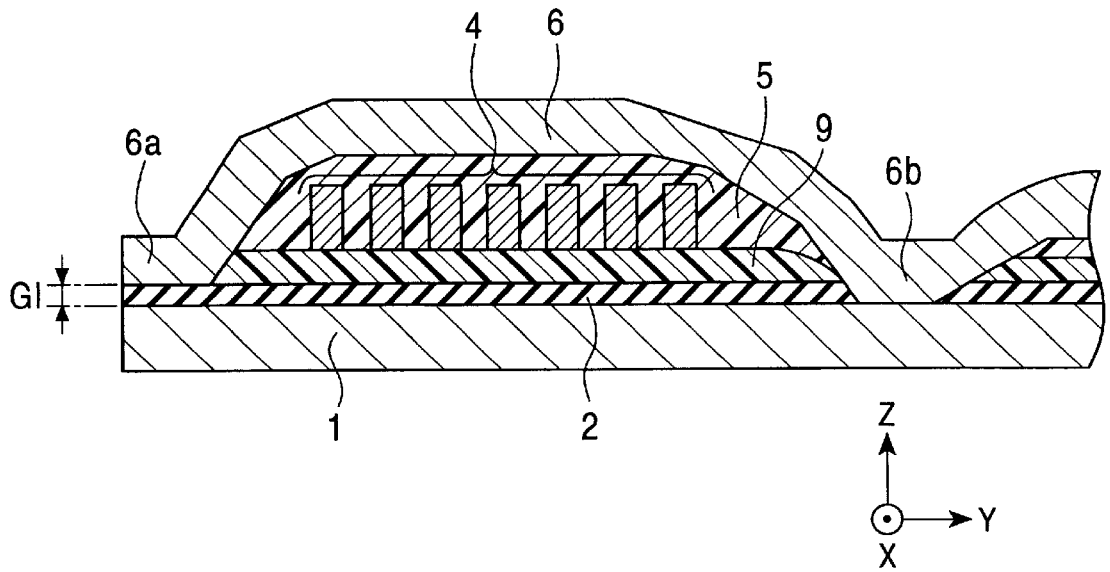
FIG. 30 is a partial vertical sectional view showing the structure of a conventional thin-film magnetic head.
Figure 31:
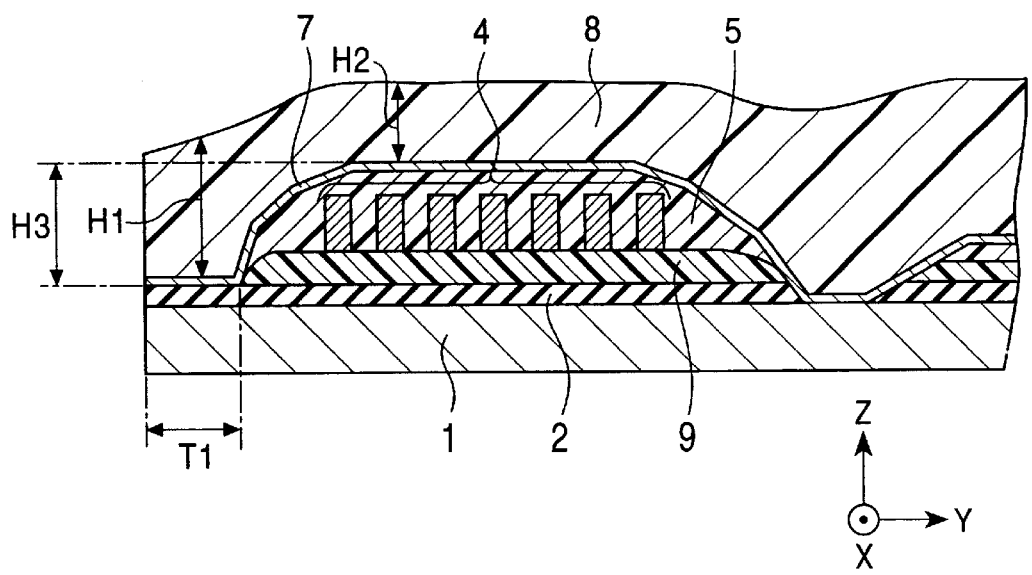
FIG. 31 shows one of successive steps for manufacturing the conventional thin-film magnetic head.

With the construction of the thin-film magnetic head of the present invention, since the coil layer 14 is already formed under the gap layer 12, the coil layer 14 is no more formed over the gap layer 12 unlike the conventional thin-film magnetic head shown in FIG. 30.

According to the present invention, therefore, the upper core layer 13 can be formed on the gap layer 12 having the flat upper surface.

The upper core layer 13 is formed by the so-called frame plating method. With the frame plating method, a resist layer is first formed on a surface on which the upper core layer 13 is to be formed, and a pattern of the upper core layer 13 is then formed on the resist layer by exposure and development. Thereafter, a layer of a magnetic material is grown in the pattern by plating, and the upper core layer 13 is formed by removing the resist layer.

Thus, the present invention can provide advantages as follows. Since the surface on which the upper core layer 13 is to be formed, i.e., the upper surface of the gap layer 12, is provided as a flat surface, the resist layer can be formed in a uniform and reduced film thickness on the gap layer 12. Therefore, an adverse effect such as diffused reflection is less likely to occur during exposure and development, and the pattern of the upper core layer 13 can be formed with good resolution. As a result, the upper core layer 13 can be formed with high accuracy.

To maintain proper electrical insulation between the upper core layer 13 and the coil layer 14, an insulating undercoat layer made of an inorganic or organic insulating material and having a small film thickness may be formed on or under the gap layer 13. In this case, however, the insulating undercoat layer must not be extended to such an extent that the extended end is exposed to the surface facing the recording medium. This is because the gap length is increased if so. Preferably, the insulating undercoat layer is formed on only a limited area of the gap layer 12 in which the coil layer 14 is formed.

In the present invention, as seen from FIG. 1, the upper core layer 13 has a portion that is exposed to the surface facing the recording medium and is formed with a width equal to the track width Tw.

As viewed in a plan view, the upper core layer 13 has a shape as shown in FIG. 4. More specifically, the upper core layer 13 comprises a fore end portion E formed to extend from the surface facing the recording medium in the height direction (Y-direction as indicated in FIG. 4) with the track width Tw, and a rear portion F formed to extend in the height direction with a width gradually increasing.

Since the rear portion F of the upper core layer 13 is formed with a relatively large width, a pattern of the rear portion F can be formed substantially into a predetermined shape even with the pattern accuracy that is not so high. Also, even if the rear portion F is formed into a shape slightly different from the predetermined shape, a resulting magnetic characteristic is not significantly affected.

On the other hand, the fore end portion E formed with the track width Tw has a very small width. In practice, the width of the fore end portion E is preferably in the range of 0.5 $\mu$m–1.0 $\mu$m. An error with respect to the target size is preferably held in the range of +0.1 $\mu$m.

In the upper core layer 13, the fore end portion E is an area that must be formed into the predetermined shape with the highest possible accuracy. It is expected that the width (=track width Tw) of the fore end portion E will be reduced more and more with an increase of the recording density in future.

Forming the fore end portion E having such a very small width requires the pattern of the fore end portion E to be high-accurately formed by increasing the pattern accuracy obtained in the steps of exposure and development.

With the present invention, as described above, the upper core layer 13 is formed on the gap layer 12 having the flat upper surface, the resist layer used for forming the upper core layer 13 can be formed in a reduced and uniform film thickness. Accordingly, the resolution is improved and an adverse effect such as diffused reflection is less likely to occur during exposure and development. As a result, the upper core layer 13 can be formed into the predetermined shape, and in particular, the fore end portion E having the track width Tw, which is to be formed with the highest possible accuracy, can be formed within a predetermined dimension allowance.

Further, with the present invention, since the upper core layer 13 can be formed with high pattern accuracy as described above, the fore end portion E can be formed to have a shorter length L3 in the height direction. As a result of forming the fore end portion E with the shorter length L3, it is possible to manufacture a thin-film magnetic head which can avoid saturation of magnetic flux and has a superior OW characteristic.

In practice, the length L3 of the fore end portion E is preferably in the range of 1.0 $\mu$m–5.0 $\mu$m.

Moreover, in the embodiment shown in FIG. 3, a lift layer 17 is formed between the lower core layer 30 and the upper core layer 13 on the side opposite to the lower magnetic pole layer 11 in the height direction. The lift layer 17 may be formed of a material that is the same as or different from the magnetic material of the lower core layer 30 and/or the upper core layer 13.

After forming the lift layer 17, a base end portion 13a of the upper core layer 13 is joined to the lift layer 17. By employing such an arrangement, a magnetic path passing through the upper core layer 13, the lift layer 17 and the lower core layer 30 can be formed, and therefore the manufacturing process can be simplified.

Also, the lift layer 17 is preferably formed to have an upper surface flush with the reference plane D as shown in FIG. 3. This feature can be achieved by polishing the upper surface of the lift layer 17 at the same time as when the upper surfaces of the coil layer 14 and the coil insulating layer 16 are polished to be flush with the reference plane D.

In the present invention, the lift layer 17 is not necessarily required. When the lift layer 17 is not formed, a hole is formed in the coil insulating layer 16 to penetrate through it and reach the upper surface of the upper core layer 13. Then, the base end portion 13a of the upper core layer 13 is formed so as to fill the hole for connection to the upper core layer 13. A magnetic path passing through the upper core layer 13 and the lower core layer 30 can be thereby formed.

According to another embodiment of the present invention, the thin-film magnetic head can be formed into such a shape as shown in FIG. 2.

Referring to FIG. 2, the gap layer 12 located between the lower magnetic pole layer 11 and the upper core layer 13 is formed to have a width equal to the track width Tw. The lower magnetic pole layer 11 formed on the lower core layer 30 is formed such that its junction surface with the gap layer 12 has a width equal to the track width Tw.

Further, the lower magnetic pole layer 11 has a projected portion 11b formed to extend from its junction surface with the gap layer 12 toward the lower core layer 30. This structure is effective in suppressing the occurrence of write fringing satisfactorily.

Additionally, in this embodiment, slopes 11a are formed at upper surfaces of the lower magnetic pole layer 11 on both opposite sides to extend from a base end of the projected portion 11b while inclining in directions away from the upper core layer 13. This structure is effective in suppressing the occurrence of write fringing more satisfactorily.

In the present invention, as shown in FIGS. 1 and 2, the upper core layer 13 exposed at the surface facing the recording medium is formed in a straight shape to extend from its junction surface with the gap layer 12 in the Z-direction as indicated in the drawings. Therefore, the upper core layer 13 itself has a structure that is effective to suppress the occurrence of write fringing.

Further, in the structure of the thin-film magnetic head shown in FIG. 2, the width of the upper core layer 13, which defines the track width Tw, can be formed smaller than the structure shown in FIG. 1. This means that, by employing the structure shown in FIG. 2, a thin-film magnetic head can be manufactured which is more adaptable for a decrease of a gap width in future.

FIG. 5 is a partial plan view of the thin-film magnetic head shown in FIG. 2. In the structure of FIG. 2, as will be seen from FIG. 5, the lower magnetic pole layer 11 and the coil insulating layer 16 are exposed on both sides of the fore end portion E of the upper core layer 13, and the gap layer 12 spreads on both sides of the rear portion F of the upper core layer 13.

On the other hand, as will be seen from FIG. 4 that is a partial plan view of the thin-film magnetic head shown in FIG. 1, the gap layer 12 spreads entirely on both sides of the upper core layer 13.

Such a difference between the plan views shown in FIGS. 4 and 5 corresponds to a difference between the front views shown in FIGS. 1 and 2. In the structures shown in FIGS. 2 and 5, the gap layer 12 is trimmed to be cut away on both sides of the fore end portion E of the upper core layer 13 as shown in FIG. 5, and the gap layer 12 is left only between the upper core layer 13 formed with the track width Tw and the projected portion 11b of the lower magnetic pole layer 11 as shown in FIG. 2. Therefore, the gap layer 12 is not present on both sides of the fore end portion E as shown in FIG. 5.

Then, upper surfaces of the lower magnetic pole layer 11 and the coil insulating layer 16, which are exposed upon removal of a part of the gap layer 12, are trimmed into the slopes as shown in FIG. 2.

Note that the thin-film magnetic head shown in FIG. 2 has the same vertical sectional view as that shown in FIG. 3.

Figure 6:
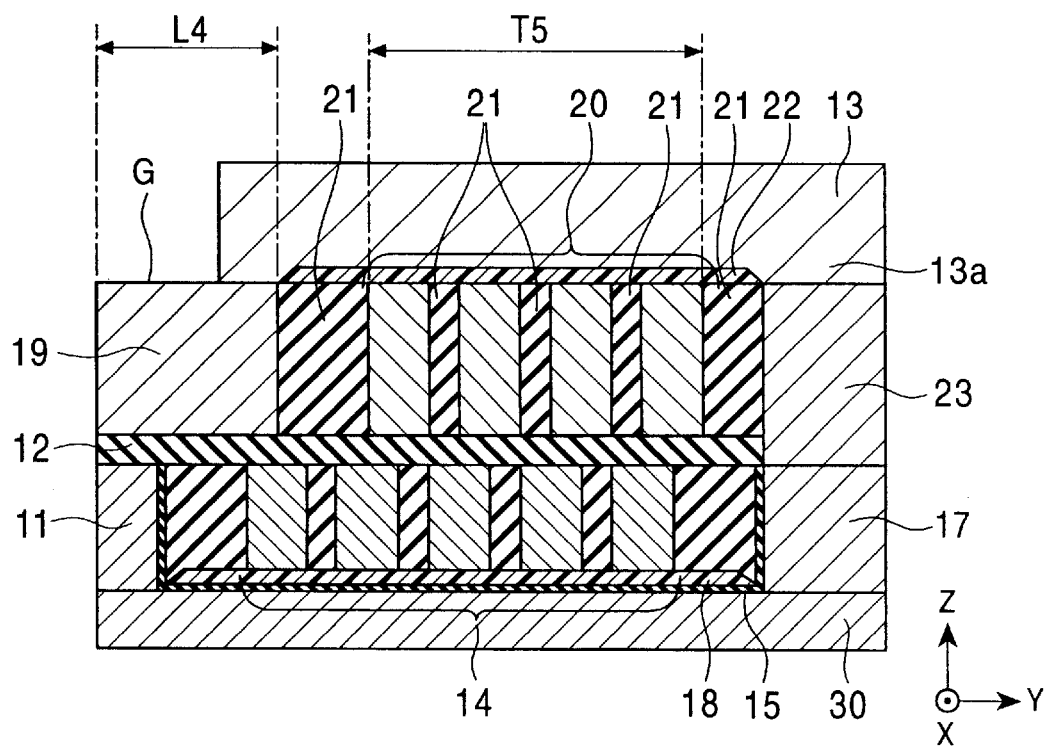
FIG. 6 is a partial vertical sectional view showing another structure of the thin-film magnetic head according to the present invention.
Figure 7:
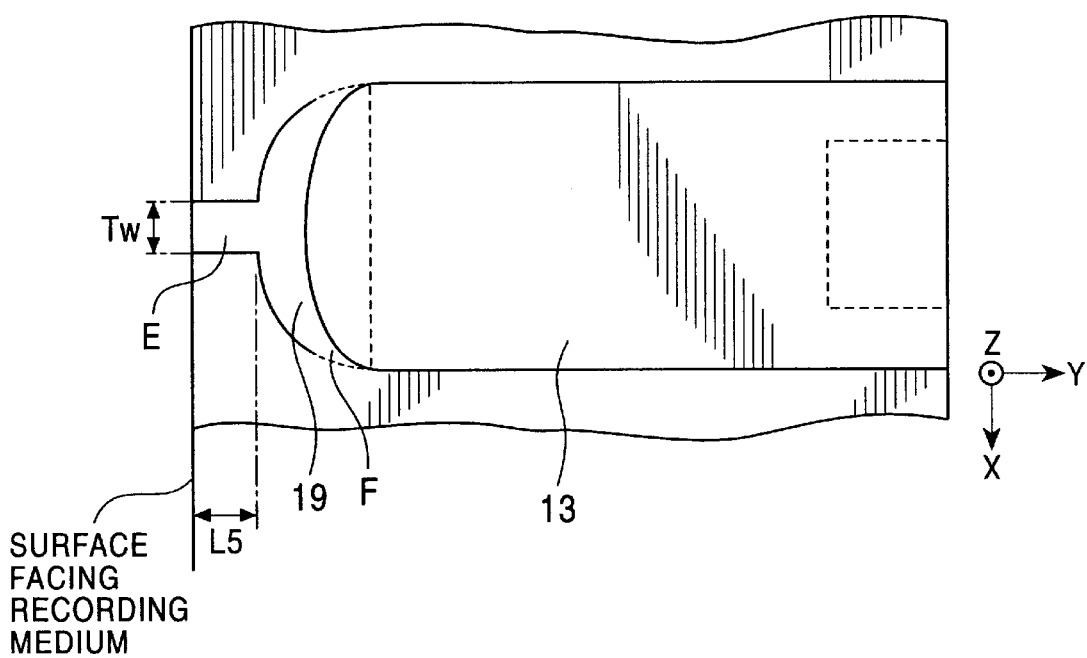
FIG. 7 is a partial plan view of the thin-film magnetic head shown in FIG. 6.

FIG. 6 is a partial vertical sectional view showing another structure of the thin-film magnetic head according to the present invention, and FIG. 7 is a partial plan view of the thin-film magnetic head shown in FIG. 6.

The thin-film magnetic head shown in FIG. 6 employs a coil layer having a two-layered structure. Specifically, in the thin-film magnetic head shown in FIG. 6, the structure under the gap layer 12 is almost the same as that of the thin-film magnetic head shown in FIG. 3.

In the thin-film magnetic head shown in FIG. 6, the structure is modified just in that the insulating undercoat layer 15 of an organic insulating material is formed, and an insulating undercoat layer 18 of an inorganic insulating material, such as a resist, is formed on the insulating undercoat layer 15 for the purpose of improving a dielectric withstand voltage between the coil layer 14 and the lower core layer 30. The order of forming the two layers 15, 18 may be modified such that the insulating undercoat layer 15 is formed on the lower side and the insulating undercoat layer 18 is then formed on the insulating undercoat layer 15.

As shown in FIG. 6, an upper magnetic pole layer 19 having a predetermined length L4 is formed on the gap layer 12 to extend from the surface facing the recording medium in the height direction. The upper magnetic pole layer 19 has a portion that is exposed to the surface facing the recording medium and is formed with width equal to the track width Tw.

The upper magnetic pole layer 19 may be formed of a material that is the same as or different from that of the upper core layer 13.

The reason why the upper magnetic pole layer 19 is formed to extend from the surface facing the recording medium over the predetermined length L4 in the height direction (Y-direction as indicated in FIG. 6) is to create a level difference with respect to the gap layer 12 for forming a second coil layer 20.

More specifically, as shown in FIG. 6, the second coil layer 20 is formed in a space corresponding to the level difference between the gap layer 12 and the upper magnetic pole layer 19. Thereafter, a second coil insulating layer 21 is then formed so as to fill spaces defined at the pitch of conductors of the second coil layer 20 between the conductors.

In this embodiment, assuming that a junction surface between the upper magnetic pole layer 19 and the upper core layer 13 is a second reference plane G, an upper surface of the second coil layer 20 and an upper surface of the second coil insulating layer 21 are leveled flush with the second reference plane G. This flush structure can be achieved by polishing the upper surfaces of the second coil layer 20 and the second coil insulating layer 21 by using the CMP technology, for example.

With such an arrangement, the height of the second coil layer 20 can be maximized within the level difference between gap layer 12 and the upper magnetic pole layer 19. As a result, a width T5 of the second coil layer 20 can be minimized and the length of a magnetic path passing through the upper core layer 13 and the lower core layer 30 can be reduced correspondingly.

In the present invention, however, the upper surface of the second coil layer 20 may be formed to position at a level lower than the second reference plane G. In this case, the upper surface of the second coil layer 20 is covered by forming the second coil insulating layer 21. Thus, a flat surface is formed only by the second coil insulating layer 21 to extend in the height direction (Y-direction as indicated in FIG. 6) along the second reference plane G.

Further, in the above case, the second coil insulating layer 21 is preferably formed of an inorganic insulating material. The reason is that the second coil insulating layer 21 is polished by using the CMP technology, for example. Stated otherwise, if the second coil insulating layer 21 is formed of an organic insulating material, this gives rise to an undesired result that the second coil insulating layer 21 cannot be properly polished because of viscosity specific to the organic insulating material.

Note that when the coil is of a two-layered structure, the second coil insulating layer 21 surrounding the second coil layer 20 to constitute a second stage is not always required to be flush with the second reference plane G.

Figure 8:
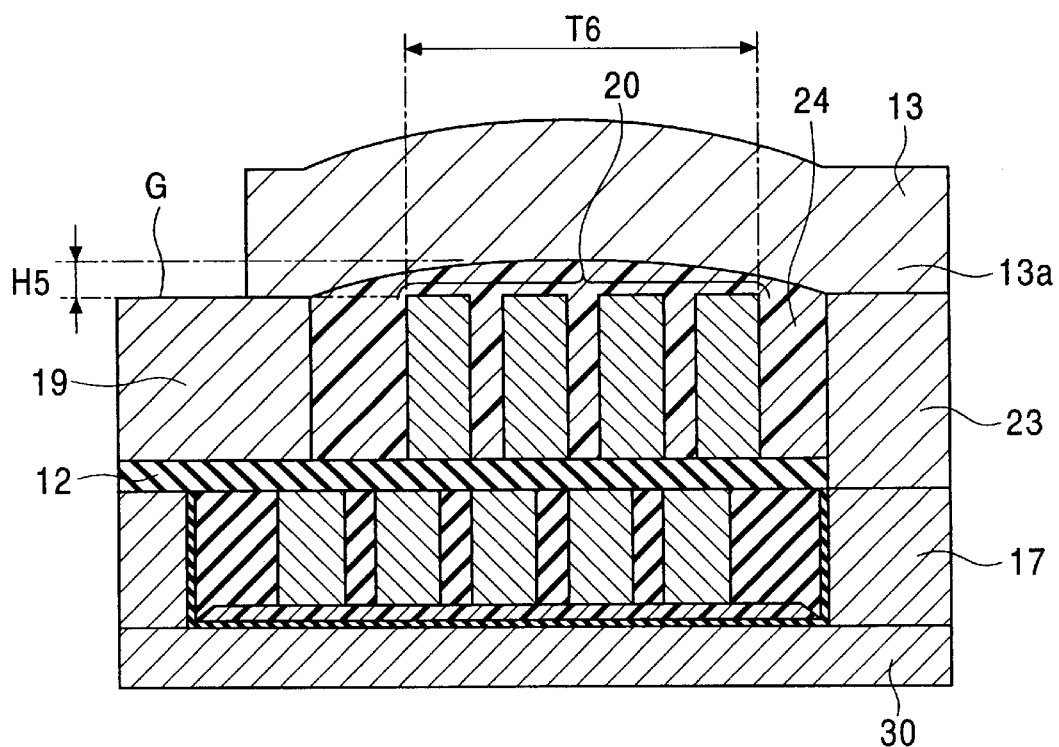
FIG. 8 is a partial vertical sectional view showing another structure of the thin-film magnetic head according to the present invention.

FIG. 8 is a partial vertical sectional view showing a modification of the thin-film magnetic head shown in FIG. 6.

In a thin-film magnetic head shown in FIG. 8, as with the head of FIG. 6, the upper magnetic pole layer 19 is formed on the gap layer 12, and the second coil layer 20 is formed on the gap layer 12 to locate in an area extending from the upper magnetic pole layer 19 in the height direction (Y-direction as indicated in FIG. 8).

Assuming that a junction surface between the upper magnetic pole layer 19 and the upper core layer 13 is a second reference plane G, an upper surface of the second coil layer 20 may be at the same level as the second reference plane G or at a level higher or lower than the second reference plane G.

In the modification shown in FIG. 8, the second coil layer 20 is formed to have the upper surface positioned at a level higher than the second reference plane G. Therefore, the second coil layer 20 can be formed with a width T6 smaller than the width T5 of the second coil layer 20 in FIG. 6. As a result, the length of a magnetic path passing through the upper core layer 13 and the lower core layer 30 can be further reduced.

In this modification, a second coil insulating layer 24 covering the second coil layer 20 is formed of an organic insulating material such as a resist and polyimide.

More specifically, as will be seen from FIG. 8, the second coil insulating layer 24 is heaped by a height H5 from the second reference plane G that is defined by the junction surface between the upper magnetic pole layer 19 and the upper core layer 13.

The upper core layer 13 is then formed on the second coil insulating layer 24. At this time, the upper core layer 13 is formed on a heaped surface by patterning. The pattern accuracy is therefore reduced as compared with the case of forming the upper core layer 13 by patterning on a perfectly flat surface.

In the magnetic head having the coil layer of the two-layered structure, however, the pattern accuracy in forming the upper core layer 13 is not required to be so high as in the case of forming the coil layer of the single-layer structure shown in FIG. 3. The reason resides in a plan shape of the upper core layer 13. This point will be described in more detail below.

As shown in FIG. 7, the upper magnetic pole layer 19 has a fore end portion E that is formed to be exposed to the surface facing the recording medium and to extend from its exposed surface in the height direction (Y-direction as indicated in FIG. 7) over a length L5 with the track width Tw. The upper magnetic pole layer 19 also has a rear portion F formed to extend from a base end of the fore end portion E, which is formed with the track width Tw, in the height direction (Y-direction as indicated in FIG. 7) with a width gradually increasing.

Thus, the upper magnetic pole layer 19 has the fore end portion E formed with the track width Tw, and the fore end portion E is required to be formed with high pattern accuracy. In both the cases of FIGS. 6 and 8, therefore, the upper magnetic pole layer 19 is formed by patterning on the gap layer 12 having the flat upper surface. This structure enables the upper magnetic pole layer 19 to be formed by patterning with high accuracy, and in particular enables the fore end portion E to be formed to have the track width Tw within a predetermined dimension allowance.

On the other hand, the upper core layer 13 is formed on the upper magnetic pole layer 19 to extend from a position spaced away from the surface facing the recording medium in the height direction, and is not exposed to the surface facing the recording medium.

More specifically, the upper core layer 13 is connected to the upper magnetic pole layer 19 at a portion near a base end of the latter, and serves only to couple a magnetic path between the upper magnetic pole layer 19 and the lower core layer 30. Also, the upper core layer 13 is formed with a relatively large width from a front end portion to a rear end portion thereof, taking into account that it is preferable to provide a magnetic volume as large as possible for easier adaptation to a higher recording density.

Accordingly, even when the surface on which the upper core layer 13 is to be formed is heaped to some extent, such a heap does not significantly affect the pattern formation of the upper core layer 13 having the large width, and hence the upper core layer 13 can be formed into the predetermined shape.

In the embodiment shown in FIG. 6, the second coil layer 20 and the second coil insulating layer 21 are formed flush with the second reference plane G. In practice, however, an insulating layer 22 is required to be formed on the second coil layer 20 and the second coil insulating layer 21 for the purpose of holding electrical insulation between the second coil layer 20 and the upper core layer 13. The insulating layer 22 may be formed of any of organic and inorganic insulating materials, or may be of a layered structure made up of both organic and inorganic insulating materials. In the embodiment shown in FIG. 6, the insulating layer 22 is formed of an organic insulating material.

Therefore, the surface on which the upper core layer 13 is to be formed is heaped to some extent in the embodiment shown in FIG. 6. Such a heap, however, has a small height and does not significantly affect the pattern formation of the upper core layer 13 for the same reason as mentioned above.

The upper core layer 13 is, as described above, formed on the upper magnetic pole layer 19 apart from the surface facing the recording medium in the height direction.

Further, as shown in FIGS. 6 and 8, a second lift layer 23 is formed on the lift layer 17, which is formed on the lower core layer 30, so as to position below the base end portion 13a of the upper core layer 13. The base end portion 13a of the upper core layer 13 is joined to an upper surface of the second lift layer 23. In each of the structures shown in FIGS.

6 and 8, a magnetic path is formed which passes through the upper magnetic pole layer 19, the upper core layer 13, the second lift layer 23, the lift layer 17, and the lower core layer 30.

The second lift layer 23 is not necessarily required. When the second lift layer 23 is not provided, the base end portion 13a of the upper core layer 13 is directly joined to the lift layer 17 formed on the lower core layer 30.

When the lift layer 17 is not formed on the lower core layer 30, the base end portion 13a of the upper core layer 13 is extended for direct connection to the upper surface of the upper core layer 13.

Also, when the lift layer 17 is not formed on the lower core layer 30, the second lift layer 23 may be formed so as to rise from the lower core layer 30, and the base end portion 13a of the upper core layer 13 may be joined onto the second lift layer 23.

In each of the cases shown in FIGS. 6 and 8, the lift layer 17 and the second lift layer 23 are both formed. The reason is that the presence of both the layers 17, 23 is advantageous in not only easily and positively establishing magnetic coupling between the lower core layer 30 and the upper core layer 13, but also facilitating the manufacture of the thin-film magnetic head.

Figure 9:
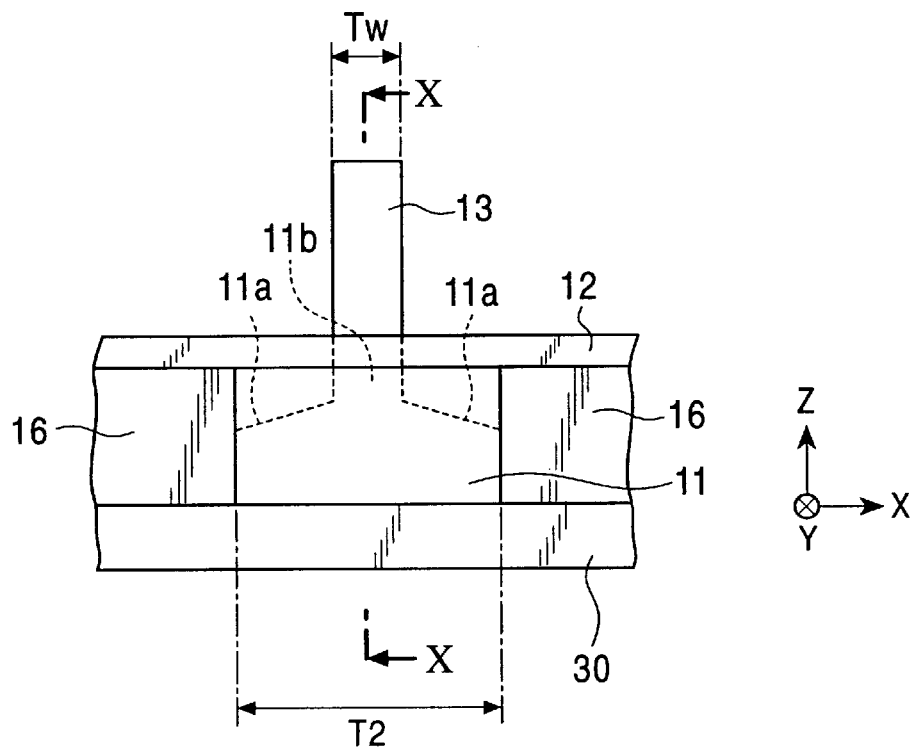
FIG. 9 is a partial front view showing another structure of the thin-film magnetic head according to the present invention.
Figure 10:
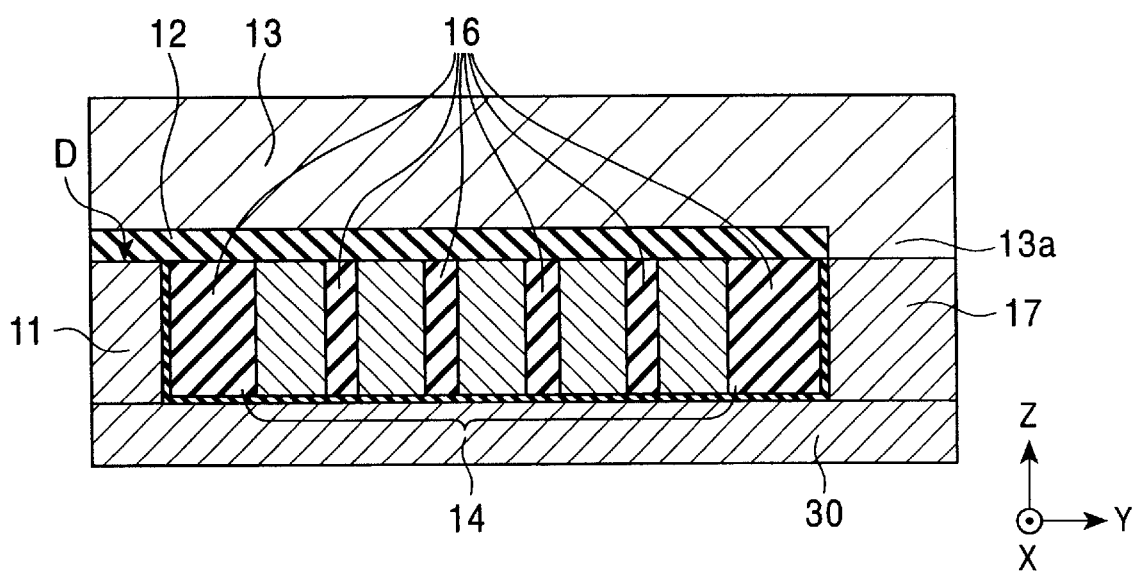
FIG. 10 is a partial vertical sectional view of the thin-film magnetic head taken along line X—X in FIG. 9.
Figure 11:
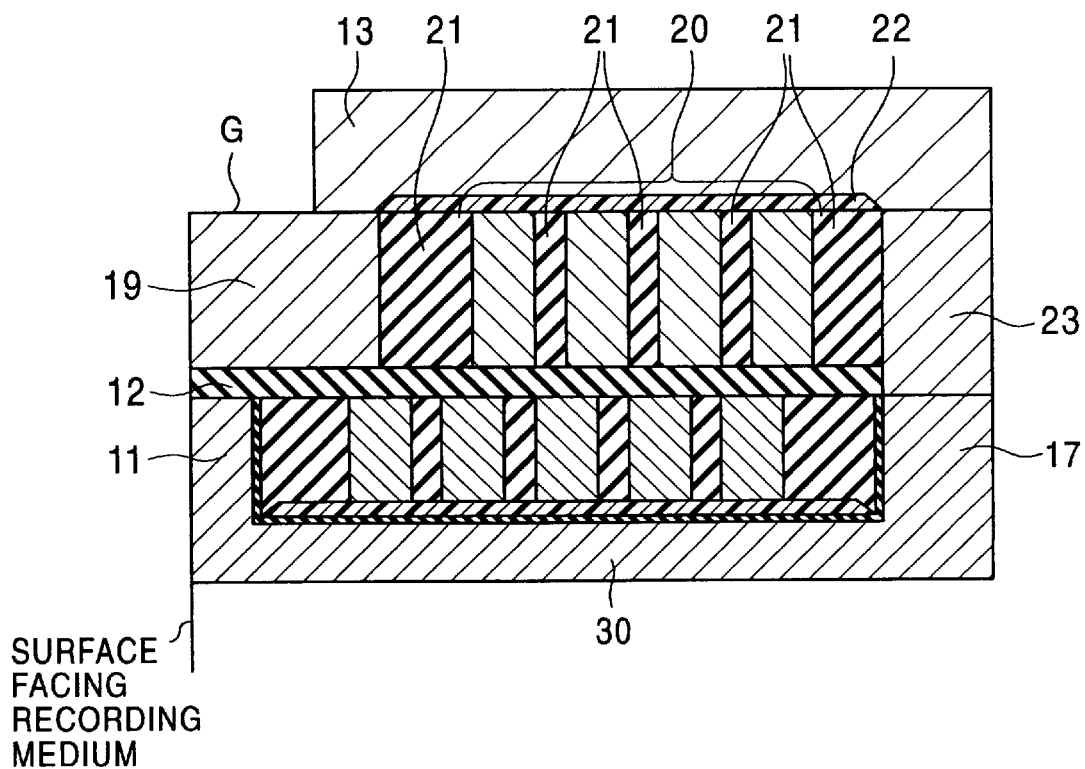
FIG. 11 is a partial vertical sectional view showing another structure of the thin-film magnetic head according to the present invention.

FIG. 9 is a partial front view showing another structure of the thin-film magnetic head according to the present invention, FIG. 10 is a partial vertical sectional view of the thin-film magnetic head taken along line X—X in FIG. 9, and FIG. 11 is a partial vertical sectional view showing another structure of the thin-film magnetic head according to the present invention.

In these embodiments, the lower core layer 30 and the lower magnetic pole layer 11 are formed into an integral structure as shown in FIG. 9.

Referring to FIG. 9, the coil insulating layer 16 is formed on both sides of the lower magnetic pole layer 11 in the direction of the track width (X-direction as indicated in FIG. 9) to be exposed to the surface facing the recording medium. Further, the gap layer 12 is formed on the lower magnetic pole layer 11 and the coil insulating layer 16. The upper core layer 13 is formed on the gap layer 12.

As shown in FIG. 9, the upper core layer 13 exposed to the surface facing the recording medium is formed to have a width equal to the track width Tw. Also, the lower magnetic pole layer 11 is formed to have a width T2 larger than the track width Tw. The reason why the width T2 of the lower magnetic pole layer 11 is set to be larger than the width (=track width Tw) of the upper core layer 13 resides in facilitating manufacture of the thin-film magnetic head as described later.

Further, as indicated by dotted lines in FIG. 9, the gap layer 12 located between the lower magnetic pole layer 11 and the upper core layer 13 is formed with the track width Tw. The lower magnetic pole layer 11 is formed such that its junction surface with the gap layer 12 has a width equal to the track width Tw. In addition, the lower magnetic pole layer 11 has a projected portion 11b formed to extend from its junction surface with the gap layer 12 toward the lower core layer 30.

Moreover, slopes 11a are formed at upper surfaces of the lower magnetic pole layer 11 on both opposite sides to extend from a base end of the projected portion 11b while inclining in directions away from the upper core layer 13.

As shown in FIG. 10, a coil layer 14 and a coil insulating layer 16 are formed in a space corresponding to a level difference between the lower magnetic pole layer 11 and the lower core layer 30. Assuming that a junction surface between the lower magnetic pole layer 11 and the gap layer 12 is a reference plane D, upper surfaces of the coil layer 14 and the coil insulating layer 16 are leveled flush with the reference plane D.

Further, as shown in FIG. 10, a lift layer 17 formed on a rear end portion of the lower core layer 30 is also formed integrally with the lower core layer 30.

In the structure shown in FIG. 10, the gap layer 12 is formed so as to cover the lower magnetic pole layer 11, the coil layer 14 and the coil insulating layer 16, and the upper core layer 13 is directly formed by patterning on the gap layer 12 having a flat upper surface. Also, as seen from FIG. 10, a base end portion 13a of the upper core layer 13 is joined to the lift layer 17 that is formed integrally with the lower core layer 30.

In the embodiment shown in FIG. 11, the lower core layer 30, the lower magnetic pole layer 11, and the lift layer 17 are likewise formed into an integral structure.

In this embodiment, the coil layer is made up of two layers as with the thin-film magnetic head shown in FIG. 6. As seen from FIG. 11, an upper magnetic pole layer 19 is formed on the gap layer 12 to extend from the surface facing the recording medium over a predetermined length in the height direction.

The upper magnetic pole layer 19 is formed such that the width in the direction of the track width (X-direction as indicated in FIG. 11) is equal to the track width Tw in its portion near the surface facing the recording medium.

As shown in FIG. 11, a second coil layer 14 and a second coil insulating layer 21 are formed in a space corresponding to a level difference between the upper magnetic pole layer 19 and the gap layer 12. Assuming that a junction surface between the upper magnetic pole layer 19 and the upper core layer 13 is a second reference plane G, upper surfaces of the second coil layer 20 and the second coil insulating layer 21 are leveled flush with the second reference plane G.

Also, as shown in FIG. 11, a second lift layer 23 is formed on the lift layer 17 that is formed integrally with the lower core layer 30.

Then, an insulating layer 22 is formed on the second coil layer 20 and the second coil insulating layer 21, and the upper core layer 13 is formed by patterning so as to cover the upper magnetic pole layer 19, the insulating layer 22 and the second lift layer 23.

Further, as shown in FIG. 11, the upper core layer 13 is joined to the upper surface of the upper magnetic pole layer 19 at a position spaced away from the surface facing the recording medium in the height direction, and a front surface of the upper core layer 13 is not exposed to the surface facing the recording medium. Further, the upper core layer 13 is formed to have a width larger than the track width Tw as with the case shown in FIG. 7.

In the present invention, as described above in detail, the coil layer 14 is formed under the gap layer 12 in any of the embodiments.

More specifically, the lower magnetic pole layer 11 is formed on the lower core layer 30, and the coil layer 14 and the coil insulating layer 16 are formed in the space corresponding to the level difference between the lower core layer 30 and the lower magnetic pole layer 11. Assuming that the junction surface between the lower magnetic pole layer 11 and the gap layer 12 is the reference plane D, the upper surface of the coil insulating layer 16 or the upper surfaces of both the coil layer 14 and the coil insulating layer 16 are leveled flush with the reference plane D. Thus, a flat surface is formed to extend in the height direction along the reference plane D.

Accordingly, in the present invention, the gap layer 12 formed on the lower magnetic pole layer 11, the coil layer 14 and the coil insulating layer 16 also has a flat upper surface.

Since the coil layer 14 is already formed under the gap layer 12 as described above, a layer that is to be formed on the gap layer 12 is only the upper core layer 13. In the present invention, therefore, the upper core layer 13 can be directly formed on the gap layer 12.

Thus, with the present invention, since the gap layer 12 has the flat upper surface, the upper core layer 13 can be formed on the gap layer 12 with high pattern accuracy.

Particularly, with the present invention, the fore end portion E of the upper core layer 13 located adjacent to the surface facing the recording medium and having the track width Tw can be formed with high accuracy. As a result, the thin-film magnetic head of the present invention can realize a narrower track width adapted for an increase of the recording density in future.

Further, in the present invention, the fore end portion E of the upper core layer 13 having the track width Tw can be formed to have a shorter length than in the conventional head, and the rear portion F thereof having a large magnetic volume can be formed closer to the surface facing the recording medium. It is therefore possible to avoid magnetic saturation in the fore end portion E, to prevent attenuation of the magnetic flux, and to improve the OW characteristic.

In the present invention, as described above, when the coil layer is of a two-layered structure, the upper core layer 13 is formed on the upper magnetic pole layer 19, which has the fore end portion E having a width equal to the track width Tw, to extend from a position spaced away from the surface facing the recording medium in the height direction, and the front surface of the upper core layer 13 is not exposed to the surface facing the recording medium.

Accordingly, the upper core layer 13 is no longer required to have the fore end portion E formed with the track width Tw, and it can be formed with a relatively large width from the front end portion to the rear end portion thereof for the purpose of increasing a magnetic volume. Hence, even when the surface on which the upper core layer 13 is to be formed is heaped to some extent, the upper core layer 13 can be formed into the predetermined shape.

Another advantage is that since the upper core layer 13 having the large width is formed on the upper magnetic pole layer 19 to extend from the position spaced away from the surface facing the recording medium in the height direction, the occurrence of write fringing can be suppressed satisfactorily.

Supposing, for example, the case where the upper core layer 13 is formed to lie over the fore end portion E of the upper magnetic pole layer 19 in FIG. 7, the upper core layer 13 having a width larger than the track width Tw would be present on the fore end portion E, and write fringing would be more apt to occur between the upper core layer 13 and the fore end portion E of the upper magnetic pole layer 19. Such an arrangement is therefore not preferable.

By contrast, in the present invention, as will be seen from FIG. 7, the upper core layer 13 is formed not on the fore end portion E of the upper magnetic pole layer 19, but on the rear portion F thereof having the width that is larger than the track width Tw and gradually increases in the height direction. Further, the width of the rear portion F of the upper magnetic pole layer 19 is almost equal to the width of the upper core layer 13. Therefore, the magnetic flux is not attenuated when passing through the upper magnetic pole layer 19 from the upper core layer 13, and a thin-film magnetic head can be manufactured which is adaptable for an increase of the recording density in future.

Also, with the present invention, the occurrence of write fringing is surely prevented by constructing the head as follows. The lower magnetic pole layer 11 formed on the lower core layer 30 or the lower magnetic pole layer 11 formed integrally with the lower core layer 30 has the projected portion 11b that is formed to have a width equal to the track width Tw at its junction surface with the gap layer 12 and to extend from the junction surface with the gap layer 12 toward the lower core layer 30. Moreover, the slopes 11a are formed at the upper surfaces of the lower magnetic pole layer 11 to extend from the base end of the projected portion 11b on both sides thereof while inclining in the directions away from the upper core layer 13. By employing such a structure, a thin-film magnetic head adaptable for a narrower track width can be manufactured.

Further, with the present invention, by forming the coil layer of a two-layered structure, the coil layer can be formed with a smaller width, and the length of a magnetic path established through the lower core layer 30 and the upper core layer 13 can be reduced. It is therefore possible to achieve a reduction of inductance and to manufacture a thin-film magnetic head adaptable for an increase of the recording density in future.

Additionally, with the present invention, since the lift layer 17 is formed on the rear end portion of the lower core layer 30 or the second lift layer 23 is formed on the lift layer 17, the upper core layer 13 and the lower core layer 30 can be magnetically coupled to each other with more ease, which is preferable in facilitating the manufacture method.

FIGS. 12 to 19 show a sequence of successive steps for a method of manufacturing the thin-film magnetic head shown in FIG. 3. FIGS. 12 to 19 are partial sectional views of the thin-film magnetic head.

Figure 12:
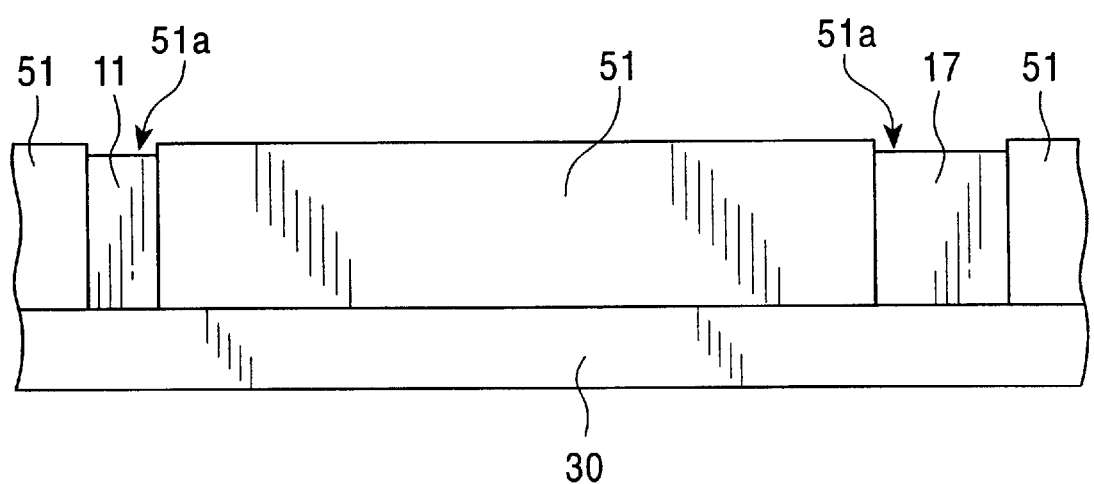
FIG. 12 shows one of successive steps for manufacturing the thin-film magnetic head shown in FIG. 3.
Figure 13:
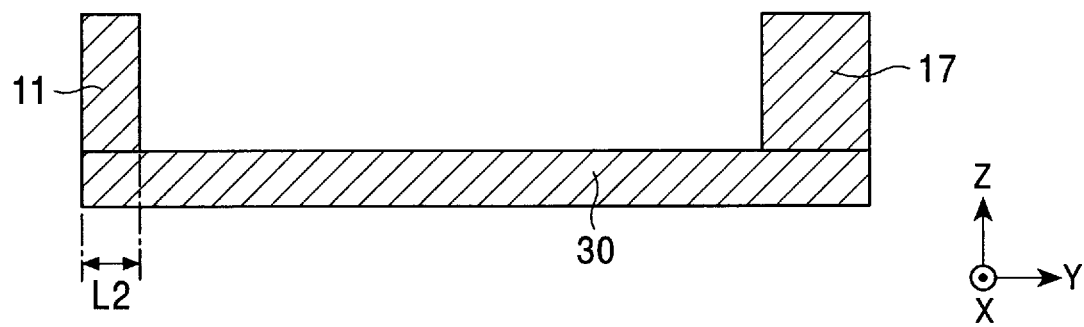
FIG. 13 shows one manufacturing step subsequent to the step shown in FIG. 12.

In the step of FIG. 12, after coating a resist layer 51 on the lower core layer 30, patterns 51a, 51a are formed in the resist layer 51 in areas where the lower magnetic pole layer 11 and the lift layer 17 are to be formed, and a magnetic material is plated in the patterns 51a, 51a. This process is generally called the frame plating method. As a result, the lower magnetic pole layer 11 and the lift layer 17 are formed on the lower core layer 30 by plating. FIG. 13 shows a state where the lower magnetic pole layer 11 and the lift layer 17 have been formed. A plating undercoat layer may be formed on the lower core layer 30, or it may be dispensed with.

In the method of the present invention, prior to the step of FIG. 12, an insulating layer is formed around the lower core layer 30 after forming it. Then, both surfaces of the lower core layer 30 and the insulating layer are polished by the CMP technology, for example, so that those surfaces are leveled flush with each other. Accordingly, the resist layer 51 can be formed on the lower core layer 30 with high pattern accuracy. Further, in a later step, the coil layer can also be formed on the lower core layer 30 with high pattern accuracy.

As shown in FIG. 13, the lower magnetic pole layer 11 is formed to extend from the surface facing the recording medium in the height direction (Y-direction as indicated in FIG. 13) over the predetermined length L2. Because the length L2 defines the gap depth Gd, it must be formed with high accuracy within a predetermined dimension allowance.

Also, the width of the lower magnetic pole layer 11 in the direction of the track width (X-direction as indicated in the drawings) is set to T2 (see FIG. 1) that is larger than the track width Tw. The reason why the width T2 is set to be larger than the track width Tw is to make sure that the fore end portion E of the upper core layer 13, which is formed with the track width Tw, is properly opposed to the lower magnetic pole layer 11 through the gap layer 12 when the upper core layer 13 is formed.

The heights of the lower magnetic pole layer 11 and the lift layer 17 may be equal to or different from each other.

The method of forming the lower magnetic pole layer 11 and the lift layer 17 on the lower core layer 30 is not limited to the manufacturing step shown in FIG. 12. As an alternative, both the layers 11 and 17 can also be formed by a manufacturing step shown in FIG. 14, for example.

Figure 14:
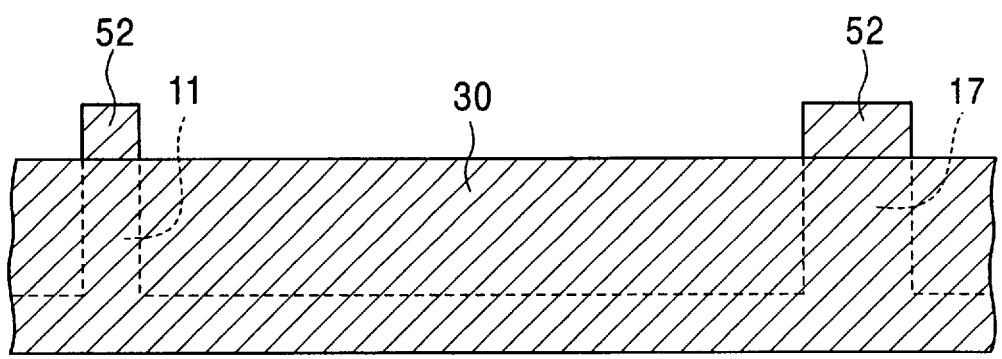
FIG. 14 shows another manufacturing step.

In the manufacturing step of FIG. 14, after forming the lower core layer 30, resist layers 52, 52 serving as protective layers are formed in areas of the surface of the lower core layer 30 where the lower magnetic pole layer 11 and the lift layer 17 are to be formed. Then, the surface of the lower core layer 30, which is not covered by the resist layers 52, is trimmed by etching, for example, to a level indicated by dotted lines in FIG. 14. The lower magnetic pole layer 11 and the lift layer 17 projecting from the lower core layer 30 are thus formed.

Note that, when employing the manufacturing step of FIG. 14, the lower core layer 30 must be formed to have an initial film thickness increased corresponding to the height of the lower magnetic pole layer 11 and the lift layer 17.

Preferably, in the present invention, after forming the lower core layer 30, an insulating layer is formed around it. Then, both surfaces of the lower core layer 30 and the insulating layer are polished by the CMP technology, for example, so that those surfaces are leveled flush with each other.

Figure 15:
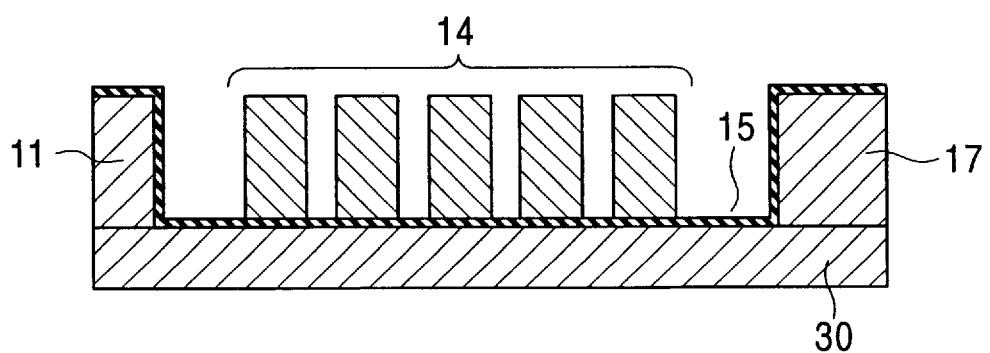
FIG. 15 shows one manufacturing step subsequent to the step shown in FIG. 13.

Next, as shown in FIG. 15, the insulating undercoat layer 15 is formed so as to cover the lower magnetic pole layer 11, the lower core layer 30, and the lift layer 17. In this embodiment, the insulating undercoat layer 15 is formed of an inorganic insulating material.

However, when the insulating undercoat layer 15 is formed of an inorganic insulating material, defects such as pin holes are more likely to occur in the insulating undercoat layer 15. It is therefore preferable that another insulating undercoat layer of an organic insulating material be formed on or under the insulating undercoat layer 15.

Alternatively, only a single insulating undercoat layer of an organic insulating material may be formed.

Thereafter, as shown in FIG. 15, the coil layer 14 is formed on the insulating undercoat layer 15 by patterning. Assuming the upper surface of the lower magnetic pole layer 11 to be a reference plane, a level of the upper surface of the coil layer 14 is preferably set to be almost equal to or higher the reference plane, but it may be lower than the reference plane.

Figure 16:
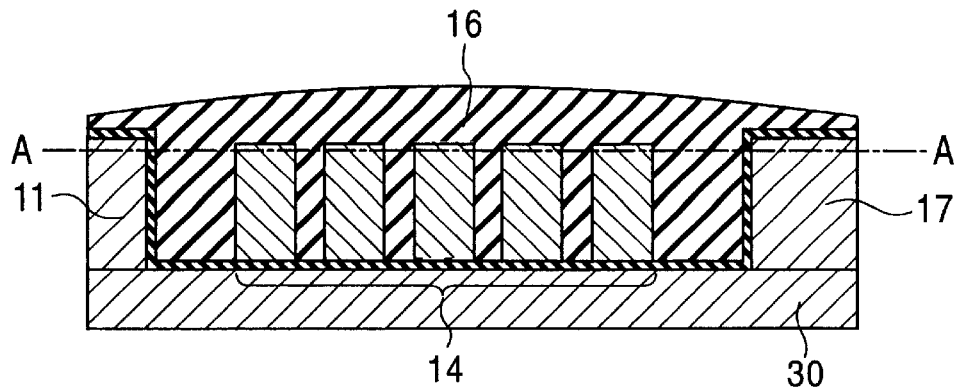
FIG. 16 shows one manufacturing step subsequent to the step shown in FIG. 15.

Next, in a step of FIG. 16, a coil insulating layer 16 is formed so as to fill spaces defined at the pitch of conductors of the coil layer 14 between the conductors. The coil insulating layer 16 is formed by any suitable known method such as sputtering. As will be seen from FIG. 16, the coil insulating layer 16 is formed not only in the spaces defined at the pitch of conductors of the coil layer 14, but also on the lower magnetic pole layer 11 and the lift layer 17. Thus, in a state after the step of FIG. 16, the coil layer 14 is completely covered by the coil insulating layer 16.

In this embodiment, the coil insulating layer 16 is formed of an inorganic insulating material. The reason why the coil insulating layer 16 is formed of an inorganic insulating material is that, in a polishing step using the CMP technology described later, the upper surface of the coil insulating layer 16 formed of an inorganic insulating material can be more easily polished. However, using an inorganic insulating material to form the coil insulating layer 16 may cause a disadvantage as follows.

When the coil insulating layer 16 is formed by, e.g., sputtering, there is a possibility that the inorganic insulating material of the coil insulating layer 16 may not fully enter the spaces defined at the pitch of conductors of the coil layer 14, and voids not filled with the coil insulating layer 16 may be formed in the spaces defined at the pitch of conductors of the coil layer 14.

Under high-temperature environment during operation of the thin film magnetic head, such voids lead to a risk that the internal structure of the magnetic head may deform due to the presence of the voids.

The above-mentioned disadvantage can be avoided, for example, by a method of first filling the spaces defined at the pitch of conductors of the coil layer 14 with an organic insulating material until reaching a position lower than the polishing line (indicated by A—A line), and then forming the coil insulating layer 16 of an inorganic insulating material on the layer of the organic insulating material.

The above method is effective in preventing voids from being formed in the spaces defined at the pitch of conductors of the coil layer 14, and avoiding deformation of the internal structure of the magnetic head when it is driven at high temperatures.

Next, as shown in FIG. 16, the upper surface of the coil insulating layer 16 is polished by the CMP technology, for example, until reaching the line A—A. In this polishing step, not only the upper surface of the coil insulating layer 16, but also the upper surfaces of the lower magnetic pole layer 11 and the lift layer 17 are partly polished.

Also, when, in the step of FIG. 15, the coil layer 14 is formed to have the upper surface at a level almost the same as or higher than the upper surface of the lower magnetic pole layer 11, the upper surface of the coil layer 14 is also polished until reaching the line A—A.

Figure 17:
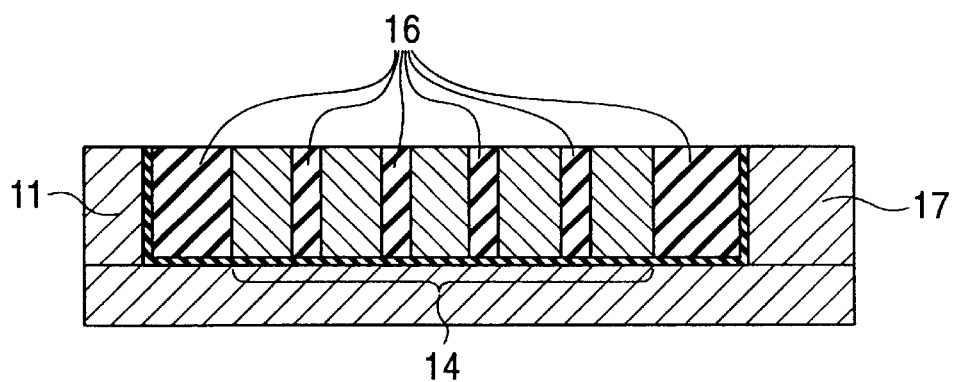
FIG. 17 shows one manufacturing step subsequent to the step shown in FIG. 16.

FIG. 17 shows a state after the above polishing step. Assuming the upper surface of the lower magnetic pole layer 11 to be a reference plane, the upper surface of the coil insulating layer 16 is leveled flush with the reference plane. Further, when the upper surface of the coil layer 14 is formed up to a level higher than the reference plane in the step of FIG. 15, the upper surface of the coil layer 14 is also polished to be flush with the reference plane.

Figure 18:
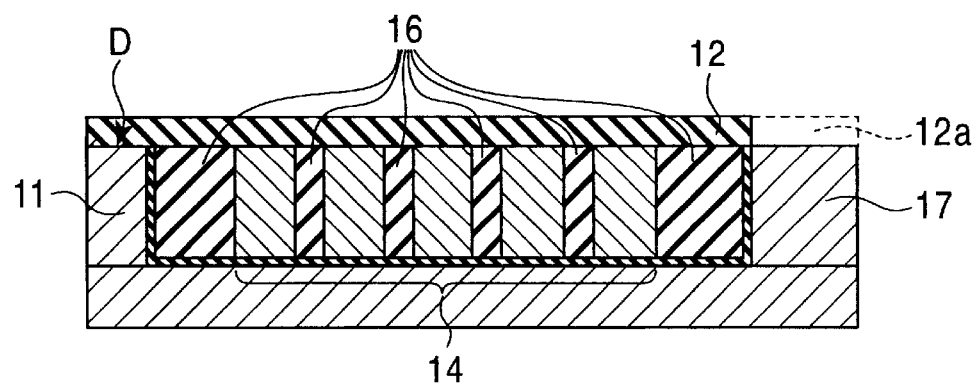
FIG. 18 shows one manufacturing step subsequent to the step shown in FIG. 17.

Next, in a step of FIG. 18, the nonmagnetic gap layer 12 is formed to cover the upper surfaces of all the lower magnetic pole layer 11, the coil layer 14, the coil insulating layer 16, and the lift layer 17.

Then, as shown in FIG. 18, a portion 12a of the gap layer 12, which is formed on the lift layer 17, is removed by any suitable known method such as etching.

Since the upper surfaces of the coil layer 14 and the coil insulating layer 16 are leveled flush with the reference plane defined by the upper surface of the lower magnetic pole layer 11, the gap layer 12 formed on the upper surfaces of the lower magnetic pole layer 11, the coil layer 14 and the coil insulating layer 16 also has a flat upper surface.

Subsequently, in a step of FIG. 19, the upper core layer 13 is formed on the gap layer 12.

The upper core layer 13 is formed, for example, by the frame plating method. According to the frame plating method, a resist layer is formed on the upper surface of the gap layer 12, and a pattern having the same shape as the upper core layer 13 is formed in the resist layer by exposure and development. Then, a magnetic material layer is grown in the pattern by plating. Finally, the upper core layer 13 is completed by removing the resist layer.

The upper core layer 13 is formed to extend from the surface facing the recording medium over the predetermined length in the height direction with the track width Tw. It is expected that the track width Tw is required to be reduced to a smaller value with an increase of the recording density in future.

With the method of the present invention, since the resist layer used for forming the upper core layer 13 is formed on the flat upper surface of the gap layer 12, the resist layer can be formed with a uniform and reduced film thickness. It is therefore possible to prevent an adverse effect such as diffused reflection otherwise occurred at the resist layer during exposure and development, to improve the resolution, and to form the upper core layer 13 in the predetermined shape with high pattern accuracy. Thus, according to the method of the present invention, the fore end portion E of the upper core layer 13, i.e., a portion of the upper core layer 13 which is to be formed to have the track width Tw with the highest possible accuracy, can be formed to have the track width Tw within a predetermined dimension allowance.

Also, according to the method of the present invention, since the fore end portion E having the track width Tw can be formed with a shorter length, a thin-film magnetic head can be manufactured which is capable of avoiding magnetic saturation and has a superior OW characteristic.

Further, as described above, a portion of the gap layer 12 locating over the lift layer 17 is removed by etching, for example, so that the upper surface of the lift layer 17 is exposed. The base end portion 13a of the upper core layer 13 is joined to the upper surface of the lift layer 17 as shown in FIG. 19.

A magnetic path leading from the upper core layer 13 to the lower core layer 30 through the lift layer 17 is thereby formed. Forming the lift layer 17 is advantageous in not only easily and positively establishing magnetic coupling between the upper core layer 13 and the lower core layer 30, but also facilitating the manufacture of the thin-film magnetic head.

Figure 20:
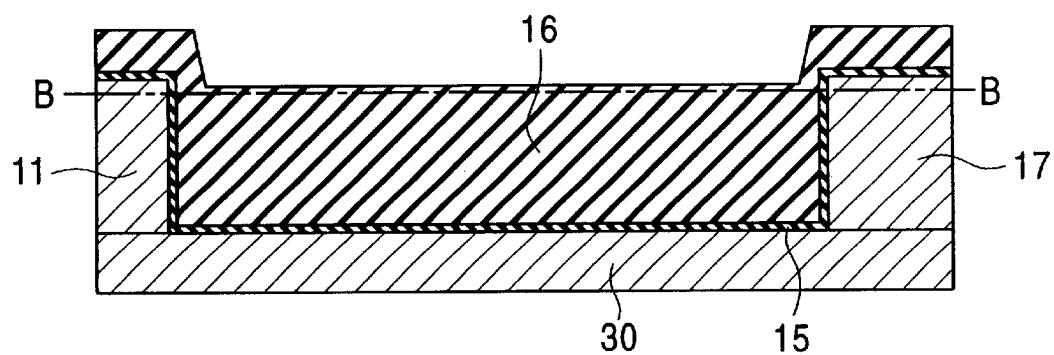
FIG. 20 shows one of other successive steps for manufacturing the thin-film magnetic head shown in FIG. 3.
Figure 21:
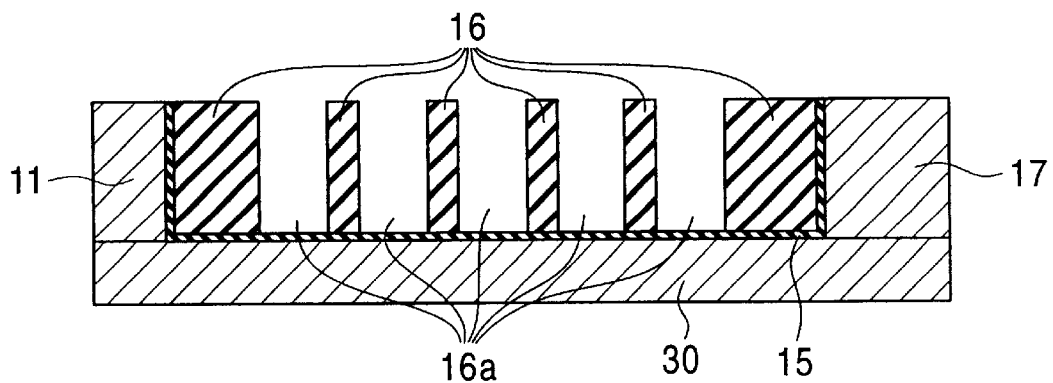
FIG. 21 shows one manufacturing step subsequent to the step shown in FIG. 20.
Figure 22:
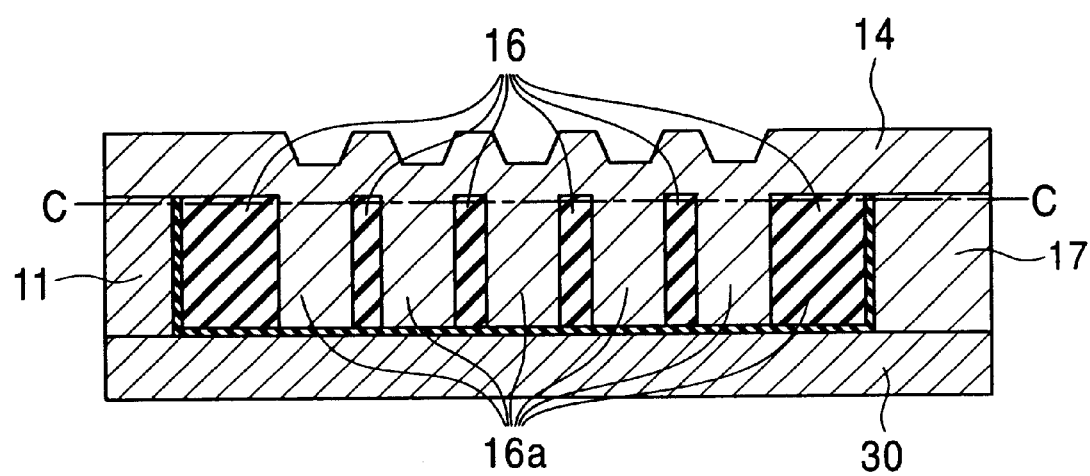
FIG. 22 shows one manufacturing step subsequent to the step shown in FIG. 21.

FIGS. 20 to 22 show another sequence of successive steps for manufacturing the thin-film magnetic head shown in FIG. 3.

First, similarly to the step of FIG. 13, the lower magnetic pole layer 11 and the lift layer 17 are formed on the lower core layer 30. Thereafter, as shown in FIG. 20, the insulating undercoat layer 15 is formed to cover the upper surfaces of all the lower magnetic pole layer 11, the lower core layer 30, and the lift layer 17. The coil insulating layer 16 is then formed by sputtering over the insulating undercoat layer 15 that has been formed on the lower core layer 30.

The coil insulating layer 16 is formed of an inorganic magnetic material. As will be seen from FIG. 20, the coil insulating layer 16 is also formed on the upper surfaces of the lower magnetic pole layer 11 and the lift layer 17.

Next, as shown in FIG. 20, the coil insulating layer 16 is polished by the CMP technology, for example, until reaching line B—B. Note that the step of polishing the coil insulating layer 16 until reaching line B—B may be dispensed with.

At the same time as polishing the coil insulating layer 16, the upper surfaces of the lower magnetic pole layer 11 and the lift layer 17 are also polished. As a result, assuming the upper surface of the lower magnetic pole layer 11 to be a reference plane, the upper surface of the coil insulating layer 16 is leveled flush with the reference plane. Further, the upper surface of the lift layer 17 is also leveled flush with the reference plane.

Subsequently, a resist layer (not shown) is formed on the coil insulating layer 16, and a pattern having the same shape as the coil layer 14 is formed in the resist layer by exposure and development. Then, portions of the coil insulating layer 16 exposed in the pattern are etched away, whereby coil forming grooves 16a having the same shape as the pattern are formed in the coil insulating layer 16. A thus-resulting state is shown in FIG. 21.

In the state shown in FIG. 21, the coil forming grooves 16a having the same shape as the pattern are formed in the coil insulating layer 16.

Also, in this state, the insulating undercoat layer 15 is left at the bottom of each coil forming grooves 16a. At the time of forming the coil forming grooves 16a, a care must be paid to avoid the insulating undercoat layer 15 from being removed to such an extent that the upper surface of the lower core layer is exposed.

The reason is that the coil layer 14 is formed in the coil forming grooves 16a in a subsequent step, and a sufficient dielectric withstand voltage must be maintained between the coil layer 14 and the lower core layer 30.

Next, as shown in FIG. 22, an electrically conductive material is filled in the coil forming grooves 16a to form the coil layer 14 therein. The coil layer 14 can be formed by any suitable known method such as metal plating, sputtering or CVD.

Also, as shown in FIG. 22, the coil layer 14 is formed not only in the coil forming grooves 16a, but also on the lower magnetic pole layer 11 and the lift layer 17. In this state, conductors of the coil layer 14 are interconnected through bridging portions over the coil forming grooves 16a. To form the coil layer 14 just within the coil forming grooves 16a, the coil layer 14 is then polished by the CMP technology, for example, until reaching line C—C.

At the same time, the upper surfaces of the lower magnetic pole layer 11, the coil insulating layer 16 and the lift layer 17 are also polished. As a result, assuming the upper surface of the lower magnetic pole layer 11 to be a reference plane, the upper surfaces of the coil insulating layer 16 and the coil layer 14 are leveled flush with the reference plane.

Figure 19:
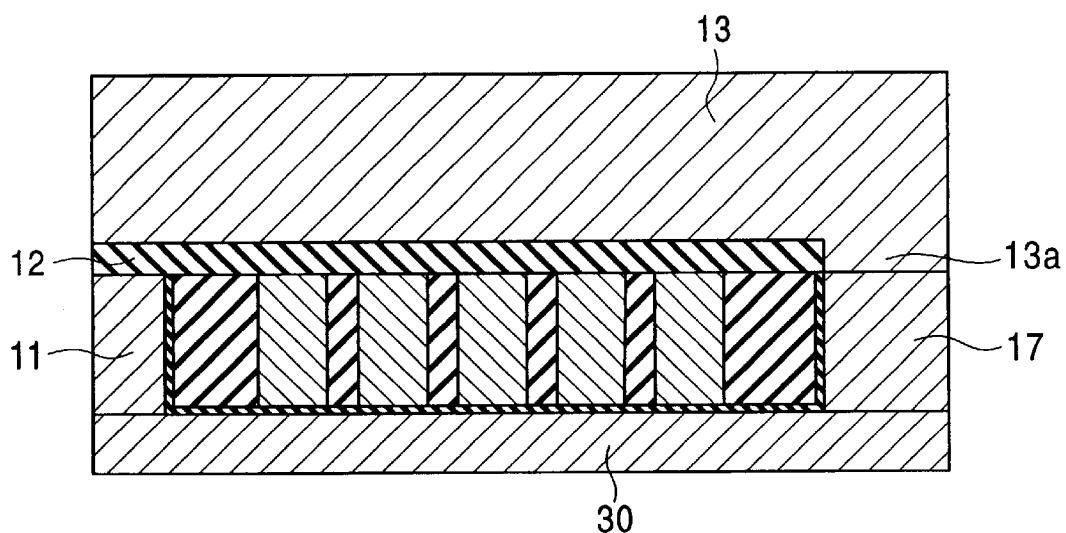
FIG. 19 shows one manufacturing step subsequent to the step shown in FIG. 18.

Thereafter, similarly to the steps of FIGS. 18 and 19, the gap layer 12 is formed on the upper surfaces of the lower magnetic pole layer 11, the coil layer 14 and the coil insulating layer 16. The upper core layer 13 is then formed on the upper surface of the gap layer 12 by the frame plating method, for example.

According to this manufacturing method, as with the above-described one, the upper surfaces of the coil insulating layer 16 and the coil layer 14 are leveled flush with the upper surface of the lower magnetic pole layer 11, and the upper surfaces of the lower magnetic pole layer 11, the coil layer 14 and the coil insulating layer 16 are formed as flat surfaces. Therefore, the upper core layer 13 can be formed on the gap layer 12 with high pattern accuracy. In particular, the fore end portion E of the upper core layer 13, which is to be formed with the track width Tw, can be formed to have the track width Tw within a predetermined dimension allowance.

Figure 23:
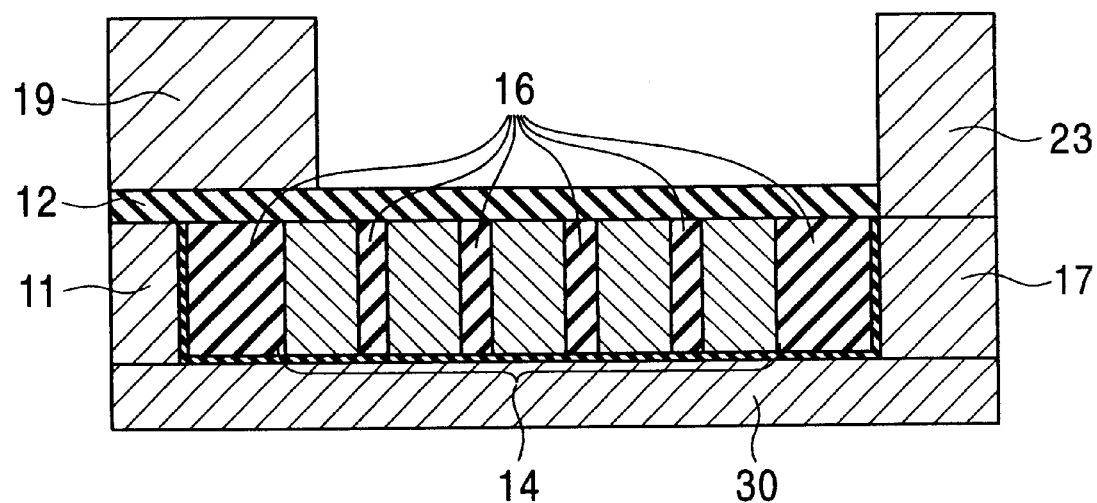
FIG. 23 shows one of successive steps for manufacturing the thin-film magnetic head shown in FIG. 6.
Figure 24:
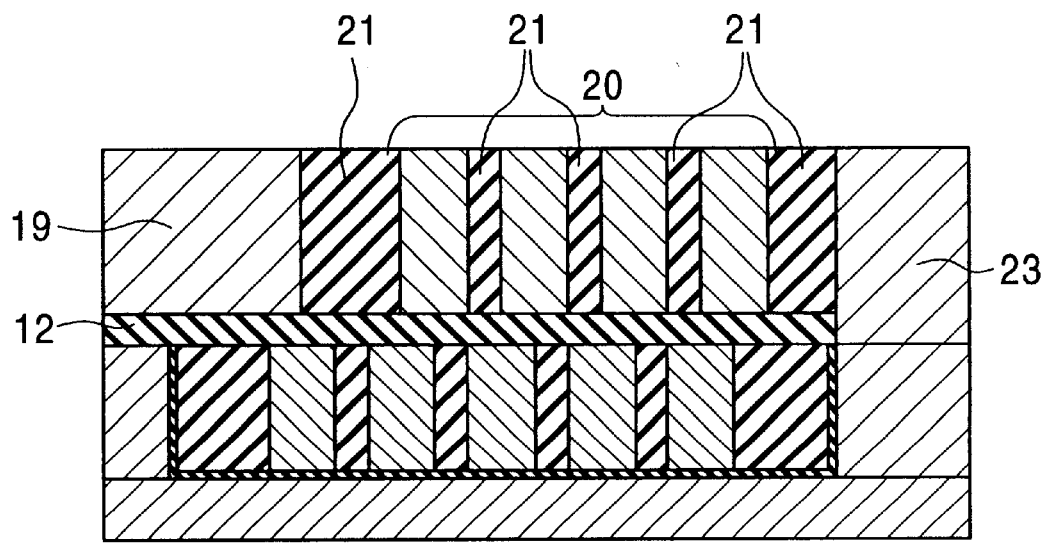
FIG. 24 shows one manufacturing step subsequent to the step shown in FIG. 23.
Figure 25:
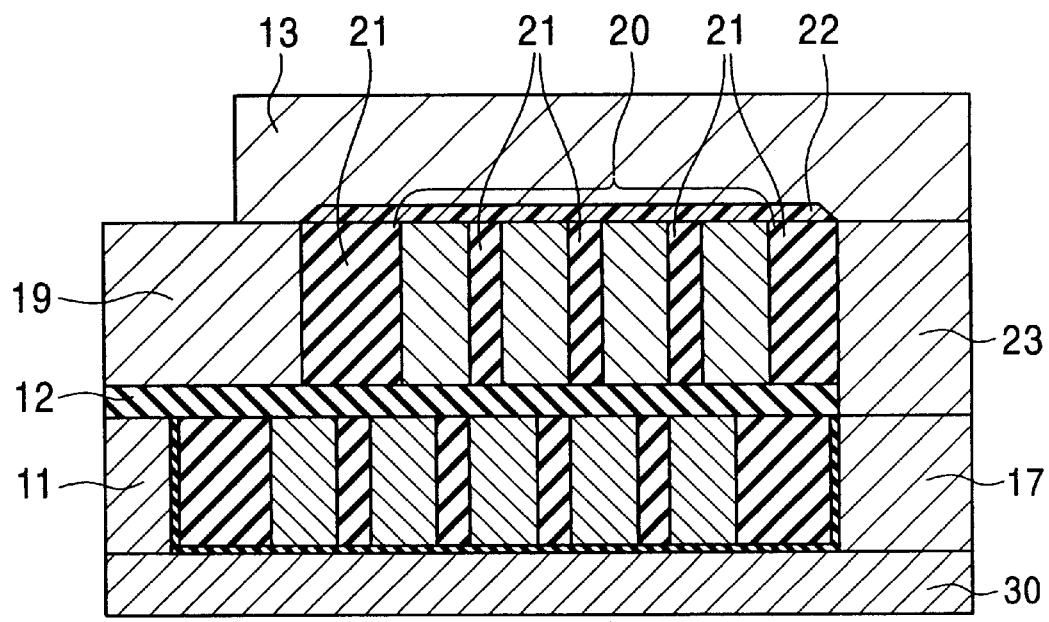
FIG. 25 shows one manufacturing step subsequent to the step shown in FIG. 24.

FIGS. 23 to 25 show a sequence of successive steps for a method of manufacturing the thin-film magnetic head shown in FIG. 6.

In a state prior to a step of FIG. 23, the lower magnetic pole layer 11, the lift layer 17, the coil layer 14, the coil insulating layer 16 and the gap layer 12 are already formed on the lower core layer 30. These layers are formed in accordance with the sequence of steps shown in FIGS. 12 to 19 or FIGS. 20 to 22.

In a step of FIG. 23, the upper magnetic pole layer 19 is formed on the gap layer 12 to extend from the surface facing the recording medium over a predetermined length in the height direction.

The upper magnetic pole layer 19 is formed by the frame plating method as with the upper core layer 13. More specifically, a resist layer (not shown) is formed on the upper surface of the gap layer 12, and a pattern having the same shape as the upper magnetic pole layer 19 is formed in the resist layer by exposure and development. Then, a magnetic material layer is grown in the pattern by plating, so that the upper magnetic pole layer 19 is formed.

The upper magnetic pole layer 19 has a plan shape as shown in FIG. 7. More specifically, the upper magnetic pole layer 19 comprises the fore end portion E formed to extend from the surface facing the recording medium in the height direction over the predetermined length with the track width Tw, and the rear portion F formed to extend from the base end of the fore end portion E in the height direction with a width gradually increasing.

As shown in FIG. 23, since the upper magnetic pole layer 19 is formed on the flat upper surface of the gap layer 12, the resist layer used for forming the upper magnetic pole layer 19 can be formed with a reduced and uniform film thickness. It is therefore possible to prevent an adverse effect such as diffused reflection otherwise occurred during exposure and development, to improve the resolution, and to form the upper magnetic pole layer 19 with high pattern accuracy. In particular, the fore end portion E of the upper magnetic pole layer 19, which is to be formed with the track width Tw, can be formed to have the track width Tw within a predetermined dimension allowance.

By forming the upper magnetic pole layer 19, as shown in FIG. 23, a level difference is created between the gap layer 12 and the upper magnetic pole layer 19. Also, in the step of FIG. 23, the second lift layer 23 is formed on the lift layer 17 that has been formed on the rear end portion of the lower core layer 30.

Next, in a step of FIG. 24, the second coil layer 20 and the second coil insulating layer 21 are formed on the gap layer 12 to locate in an area extending in the height direction from a position spaced away from the surface facing the recording medium.

A method of forming the second coil layer 20 and the second coil insulating layer 21 is the same as the above-described method of forming a first layer group, i.e., the coil layer 14 and the coil insulating layer 16 that fills the spaces defined at the pitch of conductors of the coil layer 14. In more detail, similarly to the steps of FIGS. 15 to 17, after forming a pattern of the second coil layer 20 on the gap layer 12, the second coil insulating layer 21 is formed so as to fill the spaces defined at the pitch of conductors of the second coil layer 20. Then, assuming the upper surface of the upper magnetic pole layer 19 to be a second reference plane, the upper surfaces of the second coil layer 20 and the second coil insulating layer 21 are polished by the CMP technology, for example, until those upper surfaces become flush with the second reference plane. As a result, the second coil layer 20 and the second coil insulating layer 21 can be formed.

Alternatively, as shown in FIGS. 20 to 22, after forming the second coil insulating layer 21 on the gap layer 12, the coil forming grooves are formed in the second coil insulating layer 21. Thereafter, the second coil layer 20 is formed so as to fill the coil forming grooves. Then, assuming the upper surface of the upper magnetic pole layer 19 to be a second reference plane, the upper surfaces of the second coil layer 20 and the second coil insulating layer 21 are polished by the CMP technology, for example, until those upper surfaces become flush with the second reference plane. As a result, the second coil layer 20 and the second coil insulating layer 21 can be formed.

When employing the above-described manufacturing methods, the second coil insulating layer 21 is formed of an inorganic magnetic material, and the upper surface of the second coil insulating layer 21 can be leveled flush with the upper surface of the upper magnetic pole layer 19 (=second reference plane). In the present invention, however, the upper surface of the second coil insulating layer 21 may be formed to protrude from the second reference plane to some extent. In such a case, the second coil insulating layer 21 is formed of an organic magnetic material, and a completed thin film magnetic head has the structure shown in FIG. 8.

First, the second coil layer 20 is formed by patterning in a space corresponding to a level difference between the gap layer 12 and the upper magnetic pole layer 19. At this time, the second coil layer 20 may have such a height that its upper surface is positioned flush with, or lower or higher than the upper surface of the upper magnetic pole layer 19.

Then, the second coil insulating layer 24 of an organic insulating material is formed so as to fill spaces defined at the pitch of conductors of the second coil layer 20 between the conductors. Simultaneously, the second coil insulating layer 24 covers the upper surface of the second coil layer 20 as well. Thus, it is essential that the second coil layer 20 is completely covered by the second coil insulating layer 24 as viewed from above.

As seen from FIG. 8 that shows the structure of the completed thin-film magnetic head, the second coil insulating layer 24 of an organic insulating material is formed so as to heap by a height H5 from the upper surface of the upper magnetic pole layer 19. Even with such a heap, a next step of forming the upper core layer 13 by patterning is not adversely affected.

The reason is that, as shown in FIG. 7, the upper core layer 13 is formed to extend from a position near the start point of the rear portion F of the upper magnetic pole layer 19, and has a substantially uniform width larger than the track width Tw from the front end portion to the rear end portion thereof.

Therefore, even when the upper core layer 13 is formed with pattern accuracy that is not so high as required in the step of forming the fore end portion E with the track width Tw, the upper core layer 13 can be satisfactorily formed into the predetermined shape. It is hence allowed that the surface on which the upper core layer 13 is to be formed is heaped to some extent as shown in FIG. 8.

In the case where the upper surface of the second coil layer 20 is positioned flush with the upper surface of the upper magnetic pole layer 19 and is exposed as shown in FIG. 24, the insulating layer 22 is formed on the second coil insulating layer 21 and the second coil layer 20. On that occasion, the insulating layer 22 must not be formed on the second lift layer 23. This is because the base end portion 13a of the upper core layer 13, which is formed in a next step, is joined to the second lift layer 23.

The insulating layer 22 is not required if the second coil layer 20 is not exposed to the surface on which the upper core layer 13 is to be formed. For the purpose of increasing the dielectric withstand voltage between the second coil layer 20 and the upper core layer 13, however, it is preferable to form the insulating layer 22 even if the second coil layer 20 is not exposed.

The insulating layer 22 may be formed of an inorganic or organic insulating material, but it is preferably formed of an organic insulating material from the viewpoint of increasing the dielectric withstand voltage. Also, the insulating layer 22 may have a layered structure comprising an insulating layer of an inorganic insulating material and an insulating layer of an organic insulating material.

Subsequently, as shown in FIG. 25, the upper core layer 13 is formed by the frame plating method, for example, to cover the upper magnetic pole layer 19, the insulating layer 22 and the second lift layer 23.

Also, as shown in FIG. 25, the upper core layer 13 is joined to the upper magnetic pole layer 19 at a position spaced away from the surface facing the recording medium in the height direction.

The upper core layer 13 is preferably joined, as shown in FIG. 8, to the rear portion F of the upper magnetic pole layer 19 that has a width gradually increasing from the track width Tw.

The reason why the upper core layer 13 is joined to the rear portion F of the upper magnetic pole layer 19 is that the upper core layer 13 is formed with a substantially uniform width larger than the track width Tw from the front end portion to the rear end portion thereof. If the upper core layer 13 having such a large width is formed over the fore end portion E of the upper magnetic pole layer 19 which is formed with the track width Tw, a level difference would be produced between the upper core layer 13 and the fore end portion E of the upper magnetic pole layer 19, and write fringing would be more likely to occur because of such a level difference.

For suppressing the occurrence of write fringing, it is therefore preferable that the upper core layer 13 be formed on the rear portion F of the upper magnetic pole layer 19 whose width is almost equal to the width of the upper core layer 13.

Further, as described above, the upper core layer 13 cannot be formed on a perfectly flat surface due to the presence of the insulating layer 22 formed on the surface on which the upper core layer 13 is to be formed, or due to the heaped surface of the second coil insulating layer 24. However, since the upper core layer 13 is formed with a relatively large width from the front end portion to the rear end portion thereof, the upper core layer 13 can be satisfactorily formed into the predetermined shape even when the upper core layer 13 is formed on not a perfectly flat surface, but a slightly heaped surface.

The manufacturing steps shown in FIGS. 23 to 25 represent the structure wherein the lift layer 17 is formed on the lower core layer 30. When the lift layer 17 is not formed, the second lift layer 23 is preferably formed so as to rise from the lower core layer 30.

Additionally, the second lift layer 23 may be dispensed with. In this case, however, a hole must be formed in the second coil insulating layer 21, which covers the second coil layer 20, to penetrate through it, and the base end portion 13a of the upper core layer 13 must be formed in the hole for connection to the lift layer 17 or the upper core layer 13.

Figure 26:
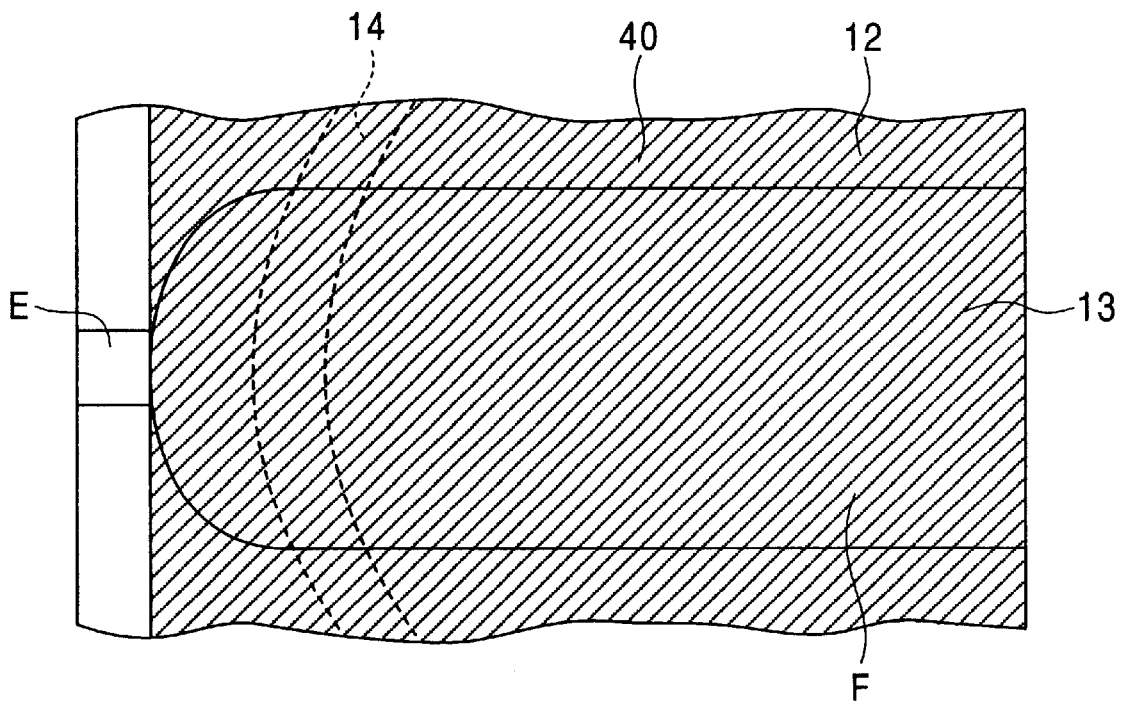
FIG. 26 shows one of successive steps for manufacturing a lower magnetic pole layer shown in FIG. 2.
Figure 27:
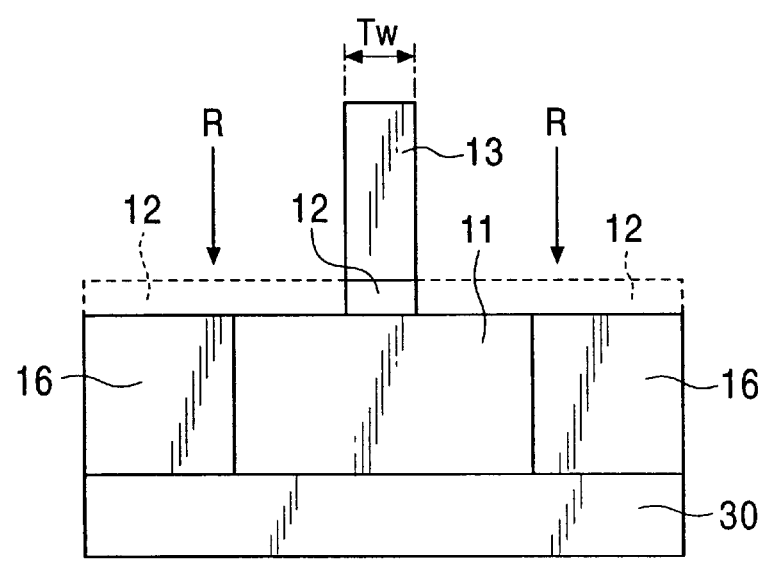
FIG. 27 shows one manufacturing step subsequent to the step shown in FIG. 26.
Figure 28:
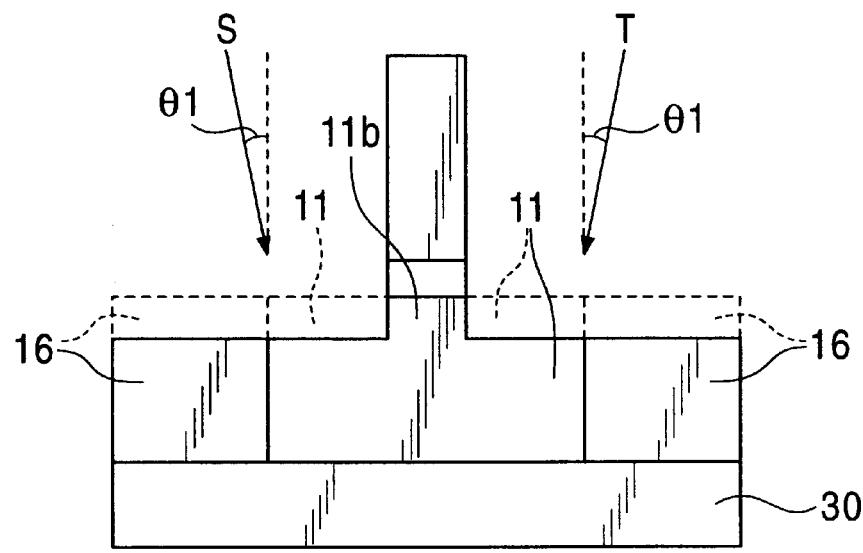
FIG. 28 shows one manufacturing step subsequent to the step shown in FIG. 27.
Figure 29:
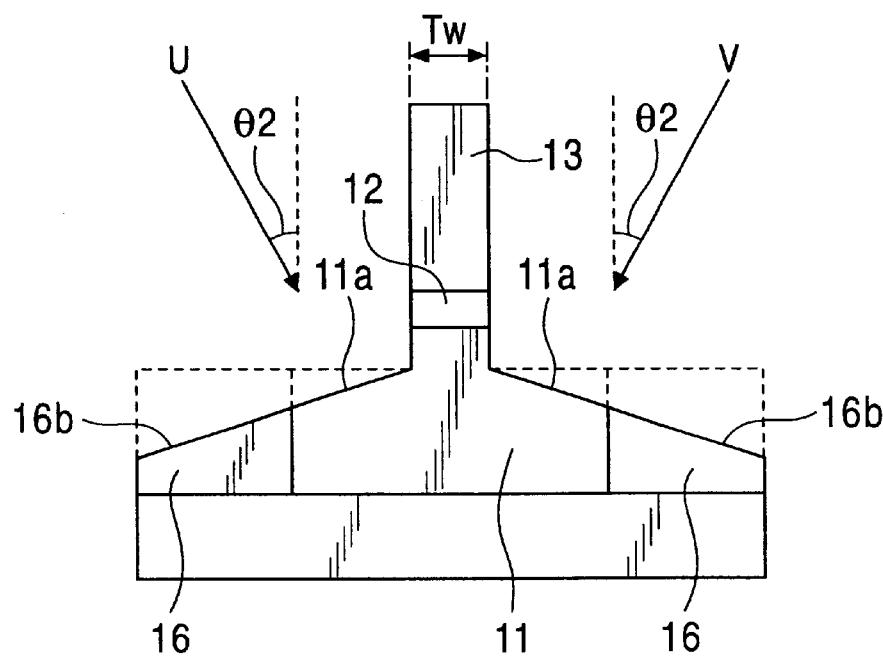
FIG. 29 shows one manufacturing step subsequent to the step shown in FIG. 28.

FIGS. 26 to 29 show a process for forming the slopes 11a in the lower magnetic pole layer 11 as shown in FIG. 2. The steps shown in FIGS. 26 to 29 are started from the state where the upper core layer 13 have been already formed. FIG. 26 is a partial plan view, and FIGS. 27 to 29 are partial front views.

In the step of FIG. 26, a resist layer 40 is coated on the upper core layer 13 and portions of the gap layer 12 which are projected from the upper core layer 13 on both sides in the direction of the track width.

An area in which the resist layer 40 is to be formed is indicated by being hatched. As will be seen from FIG. 26, the resist layer 40 is not formed on the fore end portion E of the upper core layer 13 which is formed with the track width Tw and on portions of the gap layer 12 which are formed on both sides of the fore end portion E having the track width Tw.

An area where the resist layer 40 is not formed may be extended to locate over the rear portion F of the upper core layer 13. In such a case, however, the resist layer 40 must be formed at least on an area where the coil layer 14 is formed. The reason is to surely protect the coil layer 14 against ion milling, etc. described later.

Then, as shown in FIG. 27, the gap layer 12 in the area where the resist layer 40 is not formed is removed by anisotropic etching that is effected to act only in a direction of arrow R (vertical direction). The anisotropic etching is performed by plasma etching, for example.

As a result of the above etching step, the portions of the gap layer 12 indicated by dotted lines are removed and the gap layer 12 is left between the upper core layer 13 and the lower core layer 30 while it has a width equal to the track width Tw similarly to the fore end portion E of the upper core layer 13.

Plasma etching is to selectively remove a material by a chemical action. Therefore, the lower core layer 30 and the upper core layer 13 are not damaged by the plasma etching.

In an area where the gap layer 12 has been removed, the upper surfaces of the lower magnetic pole layer 11 and the coil insulating layer 16 are exposed.

In the step of FIG. 28, the upper surfaces of the lower magnetic pole layer 11 and the coil insulating layer 16, which have been exposed with removal of the gap layer 12, are trimmed by primary ion milling.

The primary ion milling is performed using an Ar (argon) gas made up of neutral ions. In the primary ion milling, ions are irradiated in directions of arrows S and T. An angle θ1 of the ion irradiation is preferably in the range of 0° to 30°. Thus, in the primary ion milling, ions are irradiated to the upper surface of the lower magnetic pole layer 11 in directions close to the vertical.

When ions are irradiated to the lower magnetic pole layer 11 in the directions (of arrows S and T) close to the vertical, the lower magnetic pole layer 11 is trimmed by a physical action on both sides of its surface opposing to the gap layer 12 into a substantially rectangular shape. As a result, the lower magnetic pole layer 11 is almost perpendicularly recessed on both sides of that surface, and the projected portion 11b having a width substantially equal to the width (=track width Tw) of the fore end portion of the upper core layer 13 is formed under the gap layer 12.

Though not shown, magnetic powder of the lower magnetic pole layer 11 produced upon trimming by the primary ion milling adheres to opposite lateral surfaces of the upper core layer 13, the gap layer 12 and the projected portion 11b.

Such magnetic powder must be removed because adhesion of the magnetic powder deteriorates the recording characteristic. To this end, secondary ion milling is carried out. The slopes 11a serving to effectively suppress write fringing are also formed by the secondary ion milling.

As with the primary ion milling, an Ar (argon) gas made up of neutral ions is used in the secondary ion milling. As shown in FIG. 29, ions are irradiated in directions of arrows U and V in the secondary ion milling. An angle θ2 of the ion irradiation is preferably in the range of 45° to 70°. Thus, in the secondary ion milling, ions are irradiated in directions more inclined from the vertical than in the primary ion milling (where the ion irradiation angle θ2 is in the range of 0° to 30°).

When ions are irradiated in the directions of arrows U and V, the upper surface of the lower magnetic pole layer 11 is obliquely trimmed by a physical action on both sides of the projected portion 11b, whereby the slopes 11a are formed in the lower magnetic pole layer 11. With the ion irradiation, the upper surface of the coil insulating layer 16 is also trimmed so that the slopes 16b are formed in continuation with the slopes 11a.

At the same time, in the secondary ion milling process, the magnetic powder adhering to the opposite lateral surfaces of the upper core layer 13, the gap layer 12 and the projected portion 11b are scraped off and removed away. Removing the magnetic powder prevents a magnetic short-circuiting between the upper core layer 13 and the lower magnetic pole layer 11.

Also, with this method of the present invention, the opposite lateral surfaces of the upper core layer 13 are trimmed by both processes of the primary and secondary ion milling, and the track width Tw defined by the width of the upper core layer 13 is further reduced. It is therefore possible to manufacture a thin-film magnetic head that can realize a narrower track width adapted for an increase of the recording density in future.

Further, the formation of the projected portion 11b and the slopes 11a in the lower magnetic pole layer 11 is effective to suppress the occurrence of write fringing.

According to the present invention, as fully described above, the lower magnetic pole layer is formed on the lower core layer to extend from the surface facing the recording head over the predetermined length in the height direction. Then, the coil layer and the coil insulating layer are formed in the space corresponding to the level difference between the lower magnetic pole layer and the lower core layer.

Assuming that the junction surface between the lower magnetic pole layer and the gap layer is a reference plane, the upper surface of the coil insulating layer or the upper surfaces of both the coil layer and the coil insulating layer are leveled flush with the reference plane so that a flat surface is formed to extend in the height direction along the reference plane. The gap layer formed on the flat surface coincident with the reference plane can also be formed to have a flat upper surface.

In the present invention, therefore, the upper core layer, which is to be formed on the gap layer, can be formed on the flat surface, and the resist layer used for forming the upper core layer can be formed with a reduced and uniform film thickness. It is therefore possible to prevent an adverse effect such as diffused reflection otherwise occurred during exposure and development, to improve the resolution, and to form the upper core layer with high pattern accuracy.

In particular, the fore end portion of the upper core layer, which is to be formed with the track width Tw, can be formed with high accuracy to have a shorter length. A thin-film magnetic head capable of avoiding magnetic saturation and having a superior OW characteristic can be therefore manufactured.

Further, according to the present invention, the lower magnetic pole layer includes the projected portion that is formed to have a width equal to the track width Tw at its junction surface with the gap layer, and the slopes that are formed to extend from the base end of the projected portion over the upper surfaces of the lower magnetic pole layer on both sides of the projected portion while inclining in the directions away from the upper core layer. The occurrence of write fringing can be hence satisfactorily suppressed.

Also, in the present invention, the coil layer may be of a two-layered structure. By employing the two-layered structure, the coil layer can be formed with a smaller width, and the length of a magnetic path established through the lower core layer and the upper core layer can be reduced. It is therefore possible to achieve a reduction of inductance and to manufacture a thin-film magnetic head adaptable for an increase of the recording density in future.

In the case of forming the coil layer of a two-layered structure, the upper magnetic pole layer having the fore end portion to be formed with the track width Tw can be formed on the gap layer with high pattern accuracy. Further, the second coil layer and the second coil insulating layer are formed on the upper magnetic pole layer over an area extending from the upper magnetic pole layer in the height direction.

Then, by joining the upper core layer to the upper magnetic pole layer at a position spaced away from the surface facing the recording medium in the height direction, there is no longer a need of forming the upper core layer so as to have a fore end portion with the track width Tw. It is therefore allowed that the upper core layer is formed with a width larger than the track width Tw.

With such an arrangement, even when the surface on which the upper core layer is to be formed is heaped to some extent, the upper core layer can be formed into the predetermined shape with high pattern accuracy. Also, since the upper core layer having a relatively large width is formed on the upper magnetic pole layer to extend from a position spaced away from the surface facing the recording medium in the height direction as mentioned above, the occurrence of write fringing can be suppressed.

Moreover, according to the manufacturing method of the present invention, given the junction surface between the lower magnetic pole layer and the gap layer to be a reference plane, the upper surface of the coil insulating layer or the upper surfaces of both the coil insulating layer and the coil layer can be easily and surely leveled flush with the reference plane by using the CMP technology, for example, so that a flat surface is formed to extend in the height direction along the reference plane.

Therefore, the upper core layer can be formed into the predetermined shape with high pattern accuracy.

In addition, according to the present invention, since the lift layer is formed on the lower core layer, it is possible to easily realize magnetic coupling between the upper core layer and the lower core layer, and to facilitate the manufacturing method correspondingly.

What is claimed is:

1. A thin-film magnetic head comprising a lower core layer, an upper magnetic pole layer positioned in an opposing relation to said lower core layer through a nonmagnetic gap layer at a head surface facing a recording medium, said magnetic head further comprising:

a lower magnetic pole layer being formed on said lower core layer to extend from said head surface facing the recording medium over a predetermined length in a height direction, said gap layer contacting said lower magnetic pole layer; and a first coil layer and a first coil insulating layer being formed in a space corresponding to a level difference between said lower magnetic pole layer and said lower core layer, said coil insulating layer filling spaces defined at a pitch of conductors of said first coil layer between the conductors;

an upper surface of said first coil insulating layer or upper surfaces of both said first coil insulating layer and said coil layer being leveled flush with a first reference plane, which is assumed to be defined by a junction surface between said lower magnetic pole layer and said gap layer, so that a first flat surface extends in the height direction along the first reference plane;

said upper magnetic pole layer formed on said gap layer to extend from said head surface facing the recording medium over a predetermined length in the height direction, said upper magnetic pole layer having a portion exposed at said head surface facing the recording medium and formed with the track width Tw;

an upper core layer being joined onto said upper magnetic pole layer at a position spaced from said head surface facing the recording medium in the height direction;

a second coil layer being electrically connected to said first coil layer and introducing a recording magnetic field to said lower core layer and said upper core layer, and a second coil insulating layer filling spaces defined at a pitch of conductors of said second coil layer between the conductors, said second coil layer and said second coil insulating layer being formed on said gap layer to locate in an area extending from said upper magnetic pole layer in the height direction; and wherein, assuming a junction surface between said upper magnetic pole layer and said upper core layer to be a second reference plane, an upper surface of said second coil insulating layer or upper surfaces of both said second coil insulating layer and said second coil layer are leveled flush with the second reference plane so that a flat surface extends in the height direction along the second reference plane.

2. A thin-film magnetic head according to claim 1, wherein said gap layer sandwiched between said upper magnetic pole layer and said lower magnetic pole layer is formed with the track width Tw, and said lower magnetic pole layer includes a projected portion contacting said gap layer and having a width equal to the track width Tw.

3. A thin-film magnetic head according to claim 2, wherein slopes inclining in directions away from said upper core layer are formed to extend from a base end of said projected portion at upper surfaces of said lower magnetic pole layer on both sides of said projected portion.

4. A thin-film magnetic head according to claim 1, wherein said lower magnetic pole layer is formed integrally with said lower core layer.

5. A thin-film magnetic head according to claim 1, wherein a lift layer is formed on a rear end portion of said lower core layer and an upper surface of said lift layer is positioned flush with the first reference plane, said lift layer contacting a base end portion of said upper core layer.

6. A thin-film magnetic head according to claim 5, wherein said lift layer is formed integrally with said lower core layer.

7. A thin-film magnetic head according to claim 1, wherein said first coil insulating layer is formed of an inorganic insulating material.

8. A thin-film magnetic head according to claim 1, wherein the surfaces flush with the first reference plane are surfaces flattened by trimming.

9. A thin-film magnetic head according to claim 1, wherein an insulating undercoat layer is formed between said first coil layer and said lower core layer.

10. A thin-film magnetic head according to claim 1, wherein said upper magnetic pole layer comprises a fore end portion formed with the track width Tw, and a rear portion formed to extend from a base end of said fore end portion in the height direction with a width gradually increasing, said upper core layer being joined onto the rear portion of said upper magnetic pole layer.

11. A thin-film magnetic head according to claim 1, wherein said second coil insulating layer is formed of an organic insulating material.

12. A thin-film magnetic head according to claim 1, wherein said second coil insulating layer is formed of an inorganic insulating material.

13. A thin-film magnetic head according to claim 1, wherein the surfaces flush with the second reference plane are surfaces flattened by trimming.

14. A thin-film magnetic head according to claim 1, wherein when a lift layer is not formed on said lower core layer, a second lift layer is formed to rise from said lower core layer, and when a lift layer is formed on said lower core layer, said second lift layer is formed on said lift layer, a base end portion of said upper core layer being formed in contact with an upper surface of said second lift layer.

15. A thin-film magnetic head comprising a lower core layer, an upper magnetic pole layer positioned in an opposing relation to said lower core layer through a nonmagnetic gap layer at a head surface facing a recording medium, said magnetic head further comprising:

a lower magnetic pole layer being formed on said lower core layer to extend from said head surface facing the recording medium over a predetermined length in a height direction, said gap layer contacting said lower magnetic pole layer; and a first coil layer and a first coil insulating layer being formed in a space corresponding to a level difference between said lower magnetic pole layer and said lower core layer, said first coil insulating layer filling spaces defined at a pitch of conductors of said first coil layer between the conductors;

an upper surface of said first coil insulating layer or upper surfaces of both said first coil insulating layer and said first coil layer being leveled flush with a first reference plane, which is assumed to be defined by a junction surface between said lower magnetic pole layer and said gap layer, so that a first flat surface extends in the height direction along the first reference plane;

said upper magnetic pole layer formed on said gap layer to extend from said head surface facing the recording medium over a predetermined length in the height direction, said upper magnetic pole layer having a portion exposed at said head surface facing the recording medium and formed with the track width Tw;

an upper core layer being joined onto said upper magnetic pole layer at a position spaced from said head surface facing the recording medium in the height direction;

a second coil layer being electrically connected to said first coil layer and introducing a recording magnetic field to said lower core layer and said upper core layer, and a second coil insulating layer filling spaces defined at a pitch of conductors of said second coil layer between the conductors, said second coil layer and said second coil insulating layer being formed on said gap layer to locate in an area extending from said upper magnetic pole layer in the height direction;

wherein, assuming a junction surface between said upper magnetic pole layer and said upper core layer to be a second reference plane, an upper surface of said second coil insulating layer or upper surfaces of both said second coil insulating layer and said second coil layer are leveled flush with the second reference plane so that a flat surface extends in the height direction along the second reference plane; and wherein said second coil insulating layer is formed of an inorganic insulating material.

16. A thin-film magnetic head according to claim 15, wherein said gap layer sandwiched between said upper magnetic pole layer and said lower magnetic pole layer is formed with the track width Tw, and said lower magnetic pole layer includes a projected portion contacting said gap layer and having a width equal to the track width Tw.

17. A thin-film magnetic head according to claim 16, wherein slopes inclining in directions away from said upper core layer are formed to extend from a base end of said projected portion at upper surfaces of said lower magnetic pole layer on both sides of said projected portion.

18. A thin-film magnetic head according to claim 15, wherein said lower magnetic pole layer is formed integrally with said lower core layer.

19. A thin-film magnetic head according to claim 15, wherein a lift layer is formed on a rear end portion of said lower core layer and an upper surface of said lift layer is positioned flush with the first reference plane, said lift layer contacting a base end portion of said upper core layer.

20. A thin-film magnetic head according to claim 19, wherein said lift layer is formed integrally with said lower core layer.

21. A thin-film magnetic head according to claim 15, wherein said first coil insulating layer is formed of an inorganic insulating material.

22. A thin-film magnetic head according to claim 15, wherein the surfaces flush with the first reference plane are surfaces flattened by trimming.

23. A thin-film magnetic head according to claim 15, wherein an insulating undercoat layer is formed between said first coil layer and said lower core layer.

24. A thin-film magnetic head according to claim 15, wherein said upper magnetic pole layer comprises a fore end portion formed with the track width Tw, and a rear portion formed to extend from a base end of said fore end portion in the height direction with a width gradually increasing, said upper core layer being joined onto the rear portion of said upper magnetic pole layer.

25. A thin-film magnetic head according to claim 15, wherein the surfaces flush with the second reference plane are surfaces flattened by trimming.

26. A thin-film magnetic head according to claim 15, wherein when a lift layer is not formed on said lower core layer, a second lift layer is formed to rise from said lower core layer, and when a lift layer is formed on said lower core layer, said second lift layer is formed on said lift layer, a base end portion of said upper core layer being formed in contact with an upper surface of said second lift layer.

27. A thin-film magnetic head comprising a lower core layer, an upper magnetic pole layer positioned in an opposing relation to said lower core layer through a nonmagnetic gap layer at a head surface facing a recording medium, said magnetic head further comprising:

a lower magnetic pole layer being formed on said lower core layer to extend from said head surface facing the recording medium over a predetermined length in a height direction, said gap layer contacting said lower magnetic pole layer; and a first coil layer and a first coil insulating layer being formed in a space corresponding to a level difference between said lower magnetic pole layer and said lower core layer, said first coil insulating layer filling spaces defined at a pitch of conductors of said first coil layer between the conductors;

an upper surface of said first coil insulating layer or upper surfaces of both said first coil insulating layer and said first coil layer being leveled flush with a first reference plane, which is assumed to be defined by a junction surface between said lower magnetic pole layer and said gap layer, so that a first flat surface extends in the height direction along the first reference plane;

said upper magnetic pole layer formed on said gap layer to extend from said head surface facing the recording medium over a predetermined length in the height direction, said upper magnetic pole layer having a portion exposed at said head surface facing the recording medium and formed with the track width Tw;

an upper core layer being joined onto said upper magnetic pole layer at a position spaced from said head surface facing the recording medium in the height direction;

a second coil layer being electrically connected to said coil layer and introducing a recording magnetic field to said lower core layer and said upper core layer, and a second coil insulating layer filling spaces defined at a pitch of conductors of said second coil layer between the conductors, said second coil layer and said second coil insulating layer being formed on said gap layer to locate in an area extending from said upper magnetic pole layer in the height direction; and wherein, assuming a junction surface between said upper magnetic pole layer and said upper core layer to be a second reference plane, an upper surface of said second coil insulating layer or upper surfaces of both said second coil insulating layer and said second coil layer are leveled flush with the second reference plane so that a second flat surface extends in the height direction along the second reference plane;

wherein the surfaces flush with the second reference plane are surfaces flattened by trimming; and, wherein said second coil insulating layer is formed of an inorganic insulating material.

28. A thin-film magnetic head according to claim 27, wherein said gap layer sandwiched between said upper magnetic pole layer and said lower magnetic pole layer is formed with the track width Tw, and said lower magnetic pole layer includes a projected portion contacting said gap layer and having a width equal to the track width Tw.

29. A thin-film magnetic head according to claim 28, wherein slopes inclining in directions away from said upper core layer are formed to extend from a base end of said projected portion at upper surfaces of said lower magnetic pole layer on both sides of said projected portion.

30. A thin-film magnetic head according to claim 27, wherein said lower magnetic pole layer is formed integrally with said lower core layer.

31. A thin-film magnetic head according to claim 27, wherein a lift layer is formed on a rear end portion of said lower core layer and an upper surface of said lift layer is positioned flush with the first reference plane, said lift layer contacting a base end portion of said upper core layer.

32. A thin-film magnetic head according to claim 31, wherein said lift layer is formed integrally with said lower core layer.

33. A thin-film magnetic head according to claim 27, wherein said first coil insulating layer is formed of an inorganic insulating material.

34. A thin-film magnetic head according to claim 27, wherein the surfaces flush with the first reference plane are surfaces flattened by trimming.

35. A thin-film magnetic head according to claim 27, wherein an insulating undercoat layer is formed between said first coil layer and said lower core layer.

36. A thin-film magnetic head according to claim 27, wherein said upper magnetic pole layer comprises a fore end portion formed with the track width Tw, and a rear portion formed to extend from a base end of said fore end portion in the height direction with a width gradually increasing, said upper core layer being joined onto the rear portion of said upper magnetic pole layer.

37. A thin-film magnetic head according to claim 27, wherein when a lift layer is not formed on said lower core layer, a second lift layer is formed to rise from said lower core layer, and when a lift layer is formed on said lower core layer, said second lift layer is formed on said lift layer, a base end portion of said upper core layer being formed in contact with an upper surface of said second lift layer.

38. A thin-film magnetic head comprising a lower core layer, an upper magnetic pole layer positioned in an opposing relation to said lower core layer through a nonmagnetic gap layer at a head surface facing a recording medium, said magnetic head further comprising:

a lower magnetic pole layer being formed on said lower core layer to extend from said head surface facing the recording medium over a predetermined length in a height direction, said gap layer contacting said lower magnetic pole layer; and a first coil layer and first coil insulating layer being formed in a space corresponding to a level difference between said lower magnetic pole layer and said lower core layer, said first coil insulating layer filling spaces defined at a pitch of conductors of said first coil layer between the conductors;

an upper surface of said first coil insulating layer or upper surfaces of both said first coil insulating layer and said first coil layer being leveled flush with a first reference plane, which is assumed to be defined by a junction surface between said lower magnetic pole layer and said gap layer, so that a flat surface extends in the height direction along the first reference plane, said upper magnetic pole layer formed on said gap layer to extend from said head surface facing the recording medium over a predetermined length in the height direction, said upper magnetic pole layer having a portion exposed at said head surface facing the recording medium and formed with the track width Tw;

an upper core layer being joined onto said upper magnetic pole layer at a position spaced from said head surface facing the recording medium in the height direction; and a second coil layer being electrically connected to said first coil layer and introducing a recording magnetic field to said lower core layer and said upper core layer, and a second coil insulating layer filling spaces defined at a pitch of conductors of said second coil layer between the conductors, said second coil layer and said second coil insulating layer being formed on said gap layer to locate in an area extending from said upper magnetic pole layer in the height direction;

wherein when a lift layer is not formed on said lower core layer, a second lift layer is formed to rise from said lower core layer, and when a lift layer is formed on said lower core layer, said second lift layer is formed on said lift layer, a base end portion of said upper core layer being formed in contact with an upper surface of said second lift layer.

39. A thin-film magnetic head according to claim 38, wherein said gap layer sandwiched between said upper magnetic pole layer and said lower magnetic pole layer is formed with the track width Tw, and said lower magnetic pole layer includes a projected portion contacting said gap layer and having a width equal to the track width Tw.

40. A thin-film magnetic head according to claim 39, wherein slopes inclining in directions away from said upper core layer are formed to extend from a base end of said projected portion at upper surfaces of said lower magnetic pole layer on both sides of said projected portion.

41. A thin-film magnetic head according to claim 38, wherein said lower magnetic pole layer is formed integrally with said lower core layer.

42. A thin-film magnetic head according to claim 38, wherein a lift layer is formed on a rear end portion of said lower core layer and an upper surface of said lift layer is positioned flush with the first reference plane, said lift layer contacting a base end portion of said upper core layer.

43. A thin-film magnetic head according to claim 42, wherein said lift layer is formed integrally with said lower core layer.

44. A thin-film magnetic head according to claim 38, wherein said first coil insulating layer is formed of an inorganic insulating material.

45. A thin-film magnetic head according to claim 38, wherein the surfaces flush with the first reference plane are surfaces flattened by trimming.

46. A thin-film magnetic head according to claim 38, wherein an insulating undercoat layer is formed between said first coil layer and said lower core layer.

47. A thin-film magnetic head according to claim 38, wherein said upper magnetic pole layer comprises a fore end portion formed with the track width Tw, and a rear portion formed to extend from a base end of said fore end portion in the height direction with a width gradually increasing, said upper core layer being joined onto the rear portion of said upper magnetic pole layer.

48. A thin-film magnetic head according to claim 38, wherein said second coil insulating layer is formed of an organic insulating material.

* * * * *